United States Patent [19]
Tanaka et al.

[11] Patent Number: 6,087,004
[45] Date of Patent: *Jul. 11, 2000

[54] NON-MAGNETIC BLACK PARTICLES, NON-MAGNETIC BLACK PIGMENT THEREFROM AND NON-MAGNETIC BLACK FILLER THEREFROM

[75] Inventors: Yasuyuki Tanaka; Hiroko Morii; Kazuyuki Hayashi; Hiroshi Sumita, all of Hiroshima, Japan

[73] Assignee: Toda Kogyo Corporation, Japan

[*] Notice: This patent is subject to a terminal disclaimer.

[21] Appl. No.: 08/912,720

[22] Filed: Aug. 18, 1997

[30] Foreign Application Priority Data

Aug. 19, 1996 [JP] Japan .................................. 8-237135
Mar. 31, 1997 [JP] Japan .................................. 9-098339

[51] Int. Cl.$^7$ .................................................. G11B 5/706
[52] U.S. Cl. ........................ 428/403; 428/329; 106/415; 106/456; 106/459
[58] Field of Search .................... 428/329, 403; 106/415, 456, 459

[56] References Cited

U.S. PATENT DOCUMENTS

| | | | |
|---|---|---|---|
| 3,276,894 | 10/1966 | Hund et al. | 106/304 |
| 3,615,810 | 10/1971 | Hund et al. | 106/304 |
| 3,655,418 | 4/1972 | Hardy et al. | 106/304 |
| 5,269,841 | 12/1993 | Kuske et al. | 106/456 |
| 5,496,622 | 3/1996 | Isobe et al. | 428/216 |
| 5,587,232 | 12/1996 | Hayashi et al. | 428/323 |
| 5,750,250 | 5/1998 | Hayashi et al. | 428/328 |

FOREIGN PATENT DOCUMENTS 08-143316  6/1996  Japan .

*Primary Examiner*—Stevan A. Resan
*Attorney, Agent, or Firm*—Nixon & Vanderhye

[57] ABSTRACT

In accordance with the present invention, there are provided non-magnetic black particles composed primarily of Fe and having a hematite structure, which shows an excellent blackness, heat resistance, and dispersibility in a vehicle, and which particles contain manganese in an amount of 5 to 40% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 10.0 μm and a pH of not less than 5.5.

11 Claims, 2 Drawing Sheets

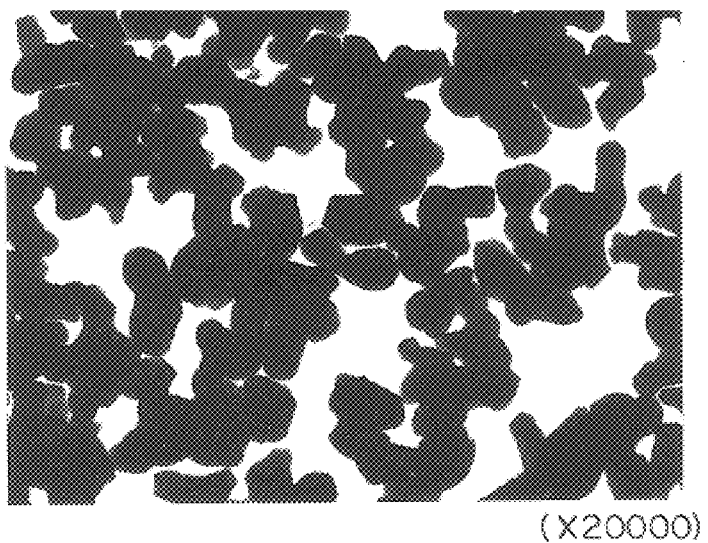
FIG. 1 (X20000)
FIG. 2 (X20000)
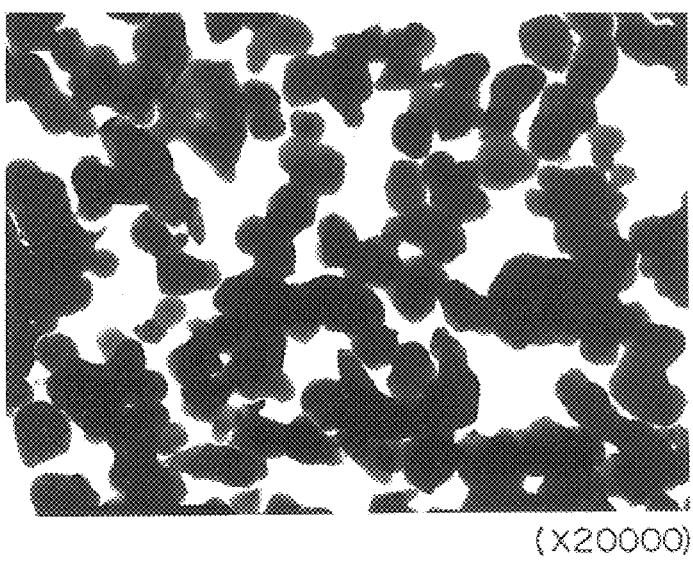
FIG. 3 (X20000)

NON-MAGNETIC BLACK PARTICLES, NON-MAGNETIC BLACK PIGMENT THEREFROM AND NON-MAGNETIC BLACK FILLER THEREFROM

BACKGROUND OF THE INVENTION

The present invention relates to non-magnetic black particles, a non-magnetic black pigment therefrom and a non-magnetic black filler therefrom. More particularly, the present invention relates to non-magnetic black particles having excellent blackness, heat resistance and dispersibility; a non-magnetic black pigment comprising the non-magnetic black particles; a non-magnetic black filler comprising the non-magnetic black particles; a paint containing the non-magnetic black pigment for forming a coating film having a high acid resistance; a rubber or resin composition containing the non-magnetic black pigment and having a high aging resistance; and a magnetic recording medium containing the non-magnetic black filler and having not only an excellent durability but also a high signal recording property.

As typical black pigments, there are known magnetite particles, carbon black, graphite fluoride or the like. These black pigments have been extensively utilized, for example, as coating materials which are prepared by mixing and dispersing the pigments in a vehicle, colorants which are prepared by mixing and dispersing the pigments in rubber or resin, or the like.

In recent years, from the standpoints of safety and hygiene and improvements in properties or in working efficiencies to meet requirements of energy-saving, there has been a strong demand for safe and non-noxious black pigments which are excellent not only in blackness and heat resistance but also in dispersibility, so that the workability thereof becomes excellent.

Conventional black pigments such as magnetite particles, carbon black and graphite fluoride have an excellent blackness, for example, a coating film formed by using such black pigment has a hue as represented by L* value of 10 to 25, a* value of −2.5 to 2.5 and b* value of −2.5 to 2.5.

In the case where these black pigments are incorporated into rubbers or resins to be molded, it is required that the pigments have a high heat resistance because they are inevitably exposed to an elevated temperature in the molding processes.

Also, in the case where these black pigments are contained in coating films to be subjected to baking finish at a high temperature, it is required that the pigments are free from discoloration even when heated at an elevated temperature such as 100 to 400° C., though the temperature range is varied depending upon kinds of resins used in the coating films.

Further, in order to improve the workability of these black pigments, it is important that the pigments are provided in the form of non-magnetic particles which have adequate particle sizes, an excellent dispersibility in a vehicle, and good handling properties.

The use of such black pigments having a good dispersibility allows coating films in which the pigments are dispersed, to have a clear color tone. This results in not only the improvement in basic characteristics inherent to pigments, such as tinting strength, hiding power or the like, but also enhanced gloss and clarity of the coating films. In addition, if the black pigments having such improved dispersibility are used, film properties of the resultant coating films, such as acid resistance and aging resistance, can also be considerably improved. Accordingly, it is strongly required to provide black pigments having a higher dispersibility.

Further, in association with recent deterioration in natural and human-life environments such as acid rains, it has also been required to improve acid proof (acid resistance) and aging resistance of film-forming materials and rubber or resin compositions, especially those used outside.

Nevertheless of safe and non-noxious substance, the magnetite particles have still posed a problem concerning heat resistance, because the black-colored magnetite particles initiates to be transformed into brown-colored maghemite particles when exposed to a temperature of not less than 150° C. In addition, the magnetite particles are apt to be re-coagulated with each other due to their magnetism, which makes it difficult for these particles to be dispersed in the binder resin, thereby causing deterioration in workability thereof. Also, in the case where such magnetite particles are used in coating materials to form coating films, the acid resistance of the obtained coating films are not necessarily satisfactory.

Carbon black has insufficient heat resistance and are in the form of bulky and ultra-fine particles having a particle size in the order of 0.01 to 0.1 $\mu$m. As a result, it is difficult to handle the carbon black and therefore, its workability is deteriorated. Also, the carbon black has posed problems concerning safety and hygiene because it has been considered to be a carcinogen.

Graphite fluoride has a problem concerning safety and cannot show sufficient heat resistance because it undergoes undesired discoloration even when exposed to a temperature in the order of 500° C. Further, the graphite fluoride has an insufficient dispersibility.

On the other hand, in association with the recent tendency that video and audio magnetic recording and reproducing apparatuses are reduced in size and weight, and are increased in recording time, there has been caused an increasing demand for magnetic recording media such as magnetic tapes or magnetic disks having a high performance, i.e., high recording density, high durability, good signal recording property or the like.

Since the magnetic recording media such as magnetic tapes or magnetic disks are brought into contact with a magnetic head upon recording and reading-out thereof, the surface of the magnetic recording medium is likely to be abraded into powdery dusts, thereby causing contamination of the magnetic head and further deterioration in reading-out properties thereof. For this reason, there have hitherto been demanded magnetic recording media having less abrasion and high durability.

Conventionally, in order to enhance an abrasion resistance and durability of the magnetic layer in the magnetic recording medium, it has been attempted to add various fillers such as alumina ($Al_2O_3$), hematite ($\alpha$-$Fe_2O_3$) and chromium trioxide ($Cr_2O_3$) in the magnetic layer.

For example, as conventional magnetic recording media using alumina ($Al_2O_3$) as the filler, there are known a magnetic recording medium using $\alpha$-$Al_2O_3$ having an amorphous phase (Japanese Patent Application Laid-open (KOKAI) No. 5-36059(1993)), a magnetic recording medium using $\alpha$-$Al_2O_3$ having a specific crystal structure (Japanese Patent Application Laid-open (KOKAI) No. 7-244836(1995)), and the like. As conventional magnetic recording media using hematite ($\alpha$-$Fe_2O_3$) as the filler, there are known a magnetic recording medium using granular α-Fe$_2$O$_3$ (Japanese Patent Application Laid-open (KOKAI) No. 61-194628(1986)), a magnetic recording medium using liquid hydrocarbon and α-Fe$_2$O$_3$ (Japanese Patent Application Laid-open (KOKAI) No. 54-70806(1979)), and the like. Further, as conventional magnetic recording media using chromium trioxide (Cr$_2$O$_3$) as the filler, there are known a magnetic recording medium using acicular Cr$_2$O$_3$ (Japanese Patent Application Laid-open (KOKAI) No. 62-112221 (1987)), and the like.

However, these fillers have posed individual problems. For example, it is known that alumina has a deteriorated dispersibility in the binder resin. Therefore, as the amount of alumina added to the binder resin is increased, the signal recording property of the magnetic recording medium is considerably decreased. Although hematite has a relatively good dispersibility in the binder resin, in order to obtain a sufficient durability of the magnetic recording medium, a large amount of hematite particles must be added to the binder resin. This causes the decrease in pack density of magnetic particles, thereby resulting in deteriorated signal recording property of the magnetic recording medium. Also, chromium trioxide is unfavorable from environmental and sanitary viewpoints.

That is, it is generally known that if the amount of such a filler added is increased to obtain a sufficient durability of the magnetic recording medium, the signal recording property thereof is considerably deteriorated.

For these reasons, there have been demanded excellent fillers for magnetic recording media which do not cause deterioration in signal recording property of the magnetic recording medium even though the fillers are used in an amount enough to improve the durability thereof.

At present, video tape systems generally used are provided with a mechanism for detecting an end position of a magnetic tape. In such a mechanism, a transparent leader tape located at an end of the magnetic tape is detected by a sensor. Accordingly, it is required that a magnetic recording portion of the magnetic tape has a low light-transmittance, i.e., a high degree of blackness.

However, in recent years, in order to meet requirements for high-density recording, magnetic particles used for the magnetic recording medium are considerably reduced in size. This results in increasing a light transmittance of a magnetic recording layer formed in the magnetic recording medium. As a result, there has been a risk that the mechanism for detecting an end position of the magnetic tape cannot be accurately operated. In order to eliminate the afore-mentioned defects, there has been adopted such a method that the content of carbon black particles in the magnetic layer is increased to lower the light transmittance thereof. However, since the carbon black particles have a low dispersibility in the binder resin, the addition of the increased amount of such carbon black particles causes the deterioration in dispersibility of magnetic particles. As a result, there are caused adverse influences on signal recording property and durability of the magnetic recording medium. In this regard, Japanese Patent Application Laid-open (KOKAI) No. 4-139619 (1992) describes " . . . when carbon black particles are added to the coating composition in the course of preparing the composition by mixing and kneading the binder resin and the magnetic particles, there arises a problem that the orientation and pack density of the magnetic particles are deteriorated as described later in Comparative Examples. In addition, since carbon black are in the form of bulky powder having a bulk density in the order of 0.1 g/cm$^3$, the carbon black is difficult to handle and therefore, causes deteriorated workability. Further, the carbon black has problems concerning safety and hygiene such as carcinogenesis . . . ".

Under these circumstances, there has been a demand for adequate filler materials suitable as substituents for carbon black. However, the afore-mentioned fillers such as alumina, hematite or chromium trioxide cannot provide sufficiently low light transmittance as compared to the carbon black, because alumina has a white color, hematite has a red color and chromium trioxide has a green color. As conventional magnetic recording media using the black pigments as the filler, there are known a magnetic recording medium using black titanium (TiO) (Japanese Patent Publications (KOKOKU) Nos. 62-21185 (1987) and 62-22179 (1987)), a magnetic recording medium using graphite fluoride (Japanese Patent Application Laid-open (KOKAI) No. 56-156930 (1981)), or the like.

However, the black titanium is susceptible to oxidation and therefore unstable in air. The graphite fluoride shows a deteriorated dispersibility in the binder resin, thereby deteriorating the signal recording property of the magnetic recording medium.

For these reasons, there is a further demand for a magnetic recording medium using such a filler which has a good dispersibility in the binder resin and a high degree of blackness, which magnetic recording medium is free from deterioration in signal recording property of the magnetic recording medium even though the filler is added thereto in an amount required to obtain a sufficient durability thereof.

Incidentally, as safe and non-noxious non-magnetic black pigments, there are known Mn-containing hematite particles as disclosed in Japanese Patent Publications (KOKOKU) Nos. 43-17288 (1968) and 47-30085 (1973)), Japanese Patent Applications Laid-open (KOKAI) Nos. 49-124127 (1974), 51-149200 (1976) and 8-143316 (1996), or the like.

Further, there have been the following several prior publications disclosing the Mn-containing hematite particles. For example, Japanese Patent Application Laid-open (KOKAI) No. 52-63199 (1977) describes a method for producing a thermostable pigment by calcining a homogeneous mixture of ferrous sulfate and a sulfate of Mn as a modifying element; Japanese Patent Publication (KOKOKU) No. 54-37004 (1979) describes a method for producing a dark-red iron oxide pigment by calcining at least one starting material selected from Fe$_2$O$_3$, FeOOH and Fe$_3$O$_4$ in the presence of a manganese compound, phosphoric acid or the like; Japanese Patent Application Laid-open (KOKAI) No. 4-144924 (1992) describes a method for producing hematite particles containing a solid solution with Mn, by preparing spherical or granular magnetite particles by a wet process, coating the magnetite particles with a manganese (Mn) compound, or with manganese (Mn) and iron (Fe) compounds, and then calcining the coated magnetite particles; Japanese Patent Application Laid-open (KOKAI) No. 5-221653 (1993) describes composite oxides of manganese and iron having a hematite structure; Japanese Patent Applications Laid-open (KOKAI) Nos. 6-263449 (1994) and 7-66020 (1995) describe a method for producing Mn-containing hematite particles by conducting a wet oxidation process in the presence of a manganese compound to prepare Mn-containing goethite particles, and then heat-dehydrating the Mn-containing goethite particles.

More specifically, Japanese Patent Publication (KOKOKU) No. 43-17288 (1968) describes a method for producing a thermostable manganese-containing iron oxide pigment having a single hematite structure, comprising oxidizing iron by an aromatic nitro compound in the presence of a ferrous salt solution and/or a concentrated solution of a hydrolytically decomposable salt, a solution of trivalent or tetravalent metal salt, a suspension of insoluble oxide, hydroxide or basic salt-containing metal, phosphoric acid or a lead compound, or a core crystal (nucleus) influenced by yellow, reddish brown or red iron hydroxide or iron oxide, characterized in that metallic manganese and/or a manganese compound are uniformly added to the process while maintaining the pH of the process at about 3.5 to about 6.5, if necessary under the addition of alkali thereto; and the obtained pigment mixture is washed, filtered and heated at 600° C. to 800° C.

Japanese Patent Application Laid-open (KOKAI) No. 51-149200 (1976) describes a method for producing thermostable black and brown pigments composed of a mixed phase of iron oxide and manganese oxide, comprising the steps of (a) mixing granular pyrolusite having a particle diameter of not more than 20 $\mu$m with ferrous sulfate heptahydrate in a range of room temperature to 95° C. so as to be brought into contact with each other; and (b) calcining a product obtained after subjecting the mixture to mixing, drying, pulverizing and screening processes, in a fluidized bed reactor operated at 800° C. to 900° C. in the presence of air.

Japanese Patent Application Laid-open (KOKAI) No. 8-143316 (1996) describes an iron oxide-based pigment having a hematite structure composed primarily of iron, which pigment is composed of no-sintered but sinterable composite oxide particles having no spinel structure when measured by X-ray diffraction; has an average particle size of 0.01 to 0.1 $\mu$m; and contains not more than 50 atomic % of manganese based on iron in the form of a solid solution with iron.

Japanese Patent Application Laid-open (KOKAI) No. 6-263449 (1994) describes (i) non-magnetic blackish brown iron oxide hydroxide particles having a goethite structure, which have a major axis diameter of 0.03 to 0.5 $\mu$m and an aspect ratio (major axis diameter/minor axis diameter) of 2 to 15, and whose aggregate thereof shows a hue represented by L* value of 30.0 to 0, a* value of 6.0 to 0 and b* value of 10.0 to −1.7 (wherein the L* value, the a* value and the b* value represent values prescribed according to JIS Z 8729); and (ii) a method for producing iron oxide hydroxide particles having a goethite structure by passing an oxygen-containing gas through a suspension containing iron-containing precipitate obtained by reacting an aqueous alkaline solution with an aqueous ferrous salt solution to conduct the oxidation reaction in the suspension, characterized in that said aqueous alkaline solution is composed of both an aqueous alkali hydroxide solution and an aqueous alkali carbonate solution; and the aqueous alkali carbonate solution is added to any one of the aqueous alkali hydroxide solution and the suspension containing iron-containing precipitate, wherein the amount of the aqueous alkali carbonate solution added is in the range of 0.4 to 20.0 moles based on one mole of the aqueous alkali hydroxide solution (except for the amount of the aqueous alkali hydroxide solution required for neutralizing a manganese compound added thereto), the sum of the aqueous alkaline solutions is more than 1.0 equivalent amount based on $Fe^{2+}$ contained in the aqueous ferrous salt solution, and the manganese compound is preliminarily added in an amount of 1 to 50 atomic % (calculated as Mn) based on $Fe^{2+}$ contained in the aqueous ferrous salt solution, to any one of the aqueous ferrous salt solution, the aqueous alkali hydroxide solution, the suspension containing the iron-containing precipitate before subjected to the oxidation reaction by passing the m oxygen-containing gas through the suspension and the suspension containing the iron-containing precipitate having a degree of oxidation of less than 50% by passing the oxygen-containing gas through the suspension.

Japanese Patent Application Laid-open (KOKAI) No. 7-66020 (1995) describes (i) non-magnetic blackish brown iron oxide hydroxide particles having a goethite structure, which have a major axis diameter of 0.03 to 0.5 $\mu$m and an aspect ratio (major axis diameter/minor axis diameter) of 10 to 30, and whose aggregate thereof shows a hue represented by L* value of 28.0 to 0, a* value of 5.3 to 0 and b* value of 9.0 to −1.7 (wherein the L* value, the a* value and the b* value represent values prescribed according to JIS Z 8729); and (ii) a method for producing iron oxide hydroxide particles having a goethite structure by passing an oxygen-containing gas through a suspension containing iron-containing precipitate obtained by reacting an aqueous alkaline solution with an aqueous ferrous salt solution to conduct the oxidation reaction in the suspension, characterized in that said aqueous alkaline solution is composed of both an aqueous alkali hydroxide solution and an aqueous alkali carbonate solution; and the aqueous alkali carbonate solution is added to any one of the aqueous alkali hydroxide solution and the suspension containing iron-containing precipitate, wherein the amount of the aqueous alkali carbonate solution added is in the range of 0.4 to 20.0 moles based on one mole of the aqueous alkali hydroxide solution (except for the amount of the aqueous alkali hydroxide solution required for neutralizing a manganese compound added thereto), the sum of the aqueous alkaline solutions is more than 1.0 equivalent amount based on $Fe^{2+}$ contained in the aqueous ferrous salt solution, and ascorbic acid or a salt thereof and the manganese compound are preliminarily added to any one of the aqueous ferrous salt solution, the aqueous alkali hydroxide solution, the suspension containing the iron-containing precipitate before subjected to the oxidation reaction by passing the oxygen-containing gas through the suspension and the suspension containing the iron-containing precipitate having a degree of oxidation of less than 50% by passing the oxygen-containing gas through the suspension, the amount of the manganese compound added being in the range of 1 to 50 atomic % (calculated as Mn) based on $Fe^{2+}$ contained in the aqueous ferrous salt solution.

Although the afore-mentioned known Mn-containing hematite particles are safe and non-noxious, they are unsatisfactory in blackness because their hue is reddish brown or blackish brown. In addition, the conventional hematite particles has insufficient dispersibility in the binder resin. Therefore, in the case where these particles are used to form coating films or rubber or resin compositions, the resultant products cannot have sufficient acid resistance and aging resistance.

Accordingly, at present, it is most required to provide Th non-magnetic black pigments which are excellent in blackness and heat resistance and can show an excellent dispersibility in the binder resin. However, such black pigments which can fulfill all of these requirements have not yet been obtained.

Also, in magnetic recording media using fillers such as alumina, hematite and chromium trioxide, when the amount of these fillers added is increased to obtain a sufficient durability, the signal recording property of the magnetic recording media is considerably deteriorated. Presently, magnetic recording media which can fulfill both the requirements for durability and signal recording property have not yet been available.

Accordingly, one of technical subjects of the present invention aims at providing a safe and non-noxious non-magnetic black pigment which is excellent not only in blackness, heat resistance but also in dispersibility in the binder resin; a non-magnetic black paint obtained by using the non-noxious non-magnetic black pigment, for forming a coating film having an excellent acid resistance; and a black rubber or resin composition obtained by using the non-noxious non-magnetic black pigment, which has excellent acid resistance and aging resistance.

Further another technical subject of the present invention aims at providing a non-magnetic black filler having an excellent dispersibility in the resin; and a magnetic recording medium obtained by using the non-magnetic black filler, which has an excellent durability and show a good signal recording property, by using black filler particles which are free from deterioration in signal recording property even though they are added in an amount enough to improve a durability of the magnetic recording media.

As a result of studies and investigations by the present inventors, it has been found that by wet-pulverizing a slurry containing Mn-containing non-magnetic black particles composed primarily of Fe and having a hematite structure and an average particle size of 0.1 to 10.0 $\mu$m, adjusting the pH of the slurry to not less than 13, and then heat-treating the resultant slurry at not less than 80° C., the thus obtained non-magnetic black particles have a high blackness, an excellent heat resistance and a good dispersibility in a vehicle. The present invention has been attained on the basis of this finding.

SUMMARY OF THE INVENTION

It is an object of the present invention to provide non-magnetic black particles having a high blackness and an excellent heat resistance, and showing a more excellent dispersibility in a vehicle than those of conventional black particles.

It is another object of the present invention to provide a non-magnetic black paint for forming a coating film having an excellent acid resistance, and a black rubber or resin composition having an excellent aging resistance.

It is a further object of the present invention to provide a magnetic recording medium having an excellent durability and a good signal recording property.

To accomplish the aims, in a first aspect of the present invention, there is provided non-magnetic black particles having a hematite structure and containing Fe as a main element, which contain manganese in an amount of 5 to 40% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 10.0 $\mu$m and a pH of not less than 5.5.

In a second aspect of the present invention, there is provided non-magnetic black particles comprising as core particles the non-magnetic black particles defined in afore-mentioned first aspect, and a coating layer formed on surfaces of said core particles and comprising at least one selected from the group consisting of hydroxides of aluminum, oxides of aluminum, hydroxides of silicon and oxides of silicon.

In a third aspect of the present invention, there is provided non-magnetic black particles having a hematite structure and containing Fe as a main element, which contain manganese in an amount of 10 to 30% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 0.5 $\mu$m and a pH of not less than 5.5.

In a fourth aspect of the present invention, there is provided non-magnetic black particles comprising as core particles the non-magnetic black particles defined in afore-mentioned third aspect, and a coating layer formed on surfaces of said core particles and comprising at least one selected from the group consisting of hydroxides of aluminum, oxides of aluminum, hydroxides of silicon and oxides of silicon.

In a fifth aspect of the present invention, there is provided a non-magnetic black pigment comprising the non-magnetic black particles defined in the afore-mentioned first or second aspect.

In a sixth aspect of the present invention, there is provided a non-magnetic black filler comprising the non-magnetic black particles defined in the afore-mentioned third or fourth aspect.

In a seventh aspect of the present invention, there is provided a non-magnetic black paint comprising 100 parts by weight of a paint base material and 0.1 to 200 parts by weight of the non-magnetic black pigment defined in the afore-mentioned fifth aspect.

In an eighth aspect of the present invention, there is provided a non-magnetic black rubber or resin composition comprising 100 parts by weight of a constituent base material for the rubber or resin composition and 0.1 to 200 parts by weight of the non-magnetic black pigment defined in the afore-mentioned fifth aspect.

In a ninth aspect of the present invention, there is provided a magnetic recording medium comprising a non-magnetic substrate, and a magnetic layer formed on the substrate and comprising a binder resin, 100 parts by weight of magnetic particles and 1 to 30 parts by weight of the black filler defined in the afore-mentioned sixth aspect.

In a tenth aspect of the present invention, there is provided a magnetic recording medium comprising a non-magnetic substrate, and a magnetic layer formed on the substrate and comprising a binder resin, 100 parts by weight of magnetic particles and 1 to 30 parts by weight of the black filler having an average particle size of 0.1 to 0.5 $\mu$m and containing manganese in an amount of 10 to 30% by weight based on the weight of the black filler.

In an eleventh aspect of the present invention, there is provided a process for producing non-magnetic black particles having a hematite structure and containing Fe as a main element, which contain manganese in an amount of 5 to 40% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 10.0 $\mu$m and a pH of not less than 5.5, which process comprises:

wet-pulverizing a slurry containing Mn-containing octahedral or spherical particles composed primarily of Fe and having a hematite structure which have an average particle size of 0.1 to 10.0 $\mu$m, adjusting the pH of the suspension to not less than 13, and then heat-treating the resultant suspension at a temperature of not less than 80° C.

BRIEF DESCRIPTION OF THE DRAWINGS

FIG. 1 is an electron photomicrograph (×20,000) showing a particle shape of a non-magnetic Mn-containing black particles composed primarily of Fe and having a hematite structure before being subjected to alkali-treatment, which was prepared in Example 1 according to the present invention;

FIG. 2 is an electron photomicrograph (×20,000) showing a particle shape of the non-magnetic Mn-containing black particles composed primarily of Fe and having a hematite structure after heat-treated with an aqueous alkali solution, which was prepared in Example 1 according to the present invention;

FIG. 3 is an electron photomicrograph (×20,000) showing a particle shape of the non-magnetic Mn-containing black particles which was prepared in Production Example 1.

DETAILED DESCRIPTION OF THE INVENTION

Figure 4:
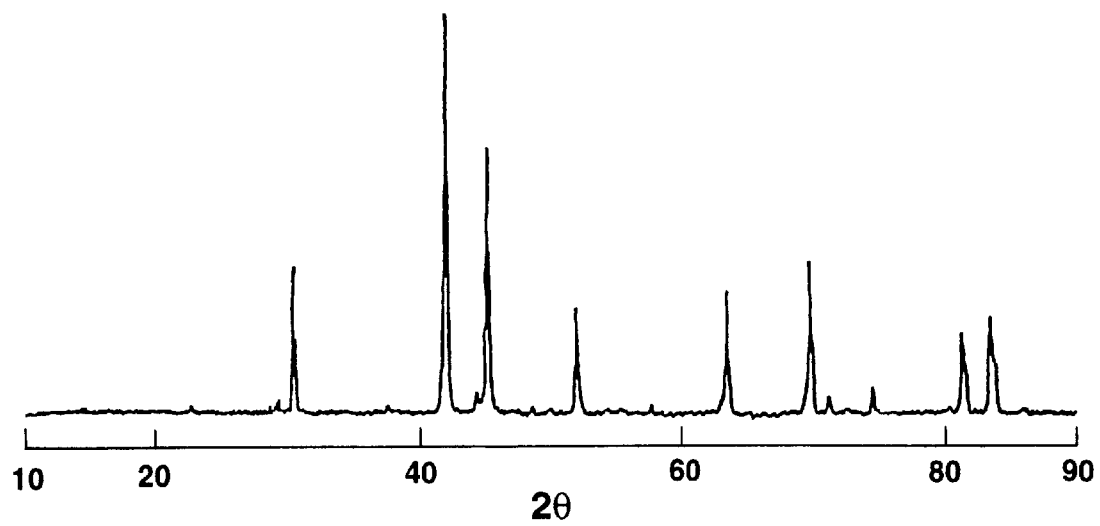
FIG. 4 is an X-ray diffraction pattern of the non-magnetic Mn-containing black particles which was prepared in Production Example 1.

First, non-magnetic black particles and non-magnetic black pigments comprising the non-magnetic black particles according to the present invention is described below.

As described in Examples hereinafter, by the measurement by X-ray diffraction, it is recognized that the non-magnetic black particles (non-magnetic Mn-containing black particles) according to the present invention have a hematite structure. This means that the particles are non-magnetic.

The non-magnetic black particles according to the present invention comprise granular-shaped particles such as octahedral particles, spherical particles, cubic (hexahedral) particles, indetermine (irregular) -shaped particles or the like. The non-magnetic black particles have an average particle size of 0.1 to 10 $\mu$m, preferably 0.1 to 5.0, more preferably 0.1 to 2.0, still more preferably 0.1 to 0.5 $\mu$m. When the average particle size is less than 0.1 $\mu$m, the particles are too fine to be dispersed in a vehicle. On the other hand, when the average particle size is more than 10 $\mu$m, the particles are too large, so that when the non-magnetic black particles are used to form coating films or resin compositions, it is difficult to obtain a sufficient surface smoothness thereof.

The geometrical standard deviation ($\sigma$g) of particle diameters of the non-magnetic black particles according to the present invention is not more than 2.0, preferably not more than 1.7, more preferably not more than 1.5. When the geometrical standard deviation ($\sigma$g) exceeds 2.0, the content of coarse particles in the non-magnetic black particles become large, so that it is difficult to obtain a sufficient surface smoothness thereof. From the standpoints of industrial properties such as productivity, the lower limit of the geometrical standard deviation ($\sigma$g) is 1.01.

The non-magnetic black particles have a manganese content of 5 to 40% by weight based on the weight of the non-magnetic black particles. When the manganese content is less than 5% by weight, the necessary blackness cannot be obtained. On the other hand, when the manganese content is more than 40% by weight, any increase in blackness is no longer expected due to its saturation though a required blackness can be obtained. The manganese content in the non-magnetic black particles is preferably in the range of 9 to 35% by weight, more preferably 10 to 30% by weight, still more preferably 10 to 20% by weight.

The pH of the non-magnetic black particles according to the present invention is not less than 5.5. When the pH of the non-magnetic black particles is less than 5.5, a large amount of acidic impurities remain at the surface of the particles to form a cross-linking structure between the particles, thereby inhibiting the particles from being dispersed in the vehicle. In view of the dispersibility in the vehicle, the lower limit of the pH of the non-magnetic black particles is preferably 6.5, more preferably 8.0. The upper limit of the pH of the non-magnetic black particles is preferably 12, more preferably 11, still more preferably 10.

The non-magnetic black particles according to the present invention have a soluble sodium salt content of not more than 500 ppm (calculated as Na). When the soluble sodium salt content exceeds 500 ppm, impurities containing the soluble sodium salt form the cross-linked structure between the particles, thereby lowering the dispersibility of the particles in the vehicle. In view of the dispersibility in the vehicle, the soluble sodium salt content in the non-magnetic black particles is preferably not more than 450 ppm, more preferably 400 ppm, still more preferably not more than 300 ppm. From the standpoint of industrial properties such as productivity, the preferable lower limit of the soluble sodium salt content is about 0.01 ppm.

The non-magnetic black particles according to the present invention have a soluble sulfate content of not more than 200 ppm (calculated as $SO_4$). When the soluble sulfate content exceeds 200 ppm, impurities containing the soluble sulfate salt form the cross-linked structure between the particles, thereby lowering the dispersibility of the particles in the vehicle. In view of the dispersibility in the vehicle, the soluble sulfate salt content in the non-magnetic black particles is preferably not more than 170 ppm, more preferably 150 ppm. From the standpoint of industrial properties such as productivity, the lower limit of the soluble sulfate salt content is about 0.01 ppm.

As described in Examples hereinafter, the non-magnetic black pigments according to the present invention have a hue represented by the L* value of 10 to 25, the a* value of −2.5 to 2.5 and the b* value of −2.5 to 2.5. This indicates that the non-magnetic black pigment according to the present invention show a sufficient degree of blackness identical to those of conventional black pigment. In view of the hue of the pigment, the L* value is preferably in the range of 10 to 24, more preferably 15 to 23; the a* value is preferably in the range of −2.5 to 2.0, more preferably −2.0 to 1.0; and the b* value is preferably in the range of −2.5 to 2.0, more preferably −2.5 to 1.0.

The non-magnetic black particles according to the present invention have a heat resistance of 0 to 2.5 when measured by the calorimetric method defined in Examples hereinafter. When the heat resistance exceeds 2.5, it is disadvantageous because the particles suffer from remarkable discoloration.

Next, the method for producing the non-magnetic black particles according to the present invention is described.

The non-magnetic black particles according to the present invention can be obtained by wet-pulverizing a slurry containing Mn-containing granular particles after calcination, composed primarily of Fe and having a hematite structure which can be produced, for example, according to the below-mentioned methods (1) and (2), and which have an average particle size of 0.1 to 10.0 $\mu$m, preferably 0.1 to 5.0 $\mu$m, more preferably 0.1 to 2.0, still more preferably 0.1 to 0.5 $\mu$m, adjusting the pH of the suspension to not less than 13, preferably 13.1 to 14, and then heat-treating the resultant suspension at a temperature of not less than 80° C., preferably 90° C. to 103° C., followed by filtering, washing with water and drying.

Method (1) for the production of Mn-containing granular particles composed primarily of Fe and having a hematite structure and an average particle size of 0.1 to 10.0 μm:

That is, while a suspension containing ferrous hydroxide colloid which is obtained by reacting an aqueous ferrous salt solution with 1.01 to 1.3 equivalent of an aqueous alkali hydroxide solution based on $Fe^{2+}$ in the aqueous ferrous salt solution is heated at a temperature of 45° C. to 100° C., an oxygen-containing gas is passed through the suspension to oxidize the ferrous hydroxide colloid and form a suspension containing octahedral magnetite particles according to magnetite-forming reaction. The obtained suspension containing the octahedral magnetite particles is mixed with an aqueous solution containing Mn or Mn and $Fe^{2+}$ such an amount that Mn is present in an amount of 8 to 150 atomic % based on a total amount of Fe in the aqueous system. Thereafter, the resultant suspension is heat-oxidized under the same condition as those of the afore-mentioned magnetite-forming reaction to coat hydroxide of Mn or hydroxides of Mn and Fe on a surface of each octahedral magnetite particle. The thus-obtained octahedral magnetite particles coated with the hydroxide of Mn or the hydroxides of Mn and Fe are filtered out, washed with water and dried, and then calcined at a temperature of 750° C. to 1,000° C. to obtain the afore-mentioned octahedral particles.

Method (2) for the production of Mn-containing granular particles composed primarily of Fe and having a hematite structure and an average particle size of 0.1 to 10 μm:

That is, while a suspension containing ferrous hydroxide colloid which is obtained by reacting an aqueous ferrous salt solution with 0.80 to 0.99 equivalent of an aqueous alkali hydroxide solution based on $Fe^{2+}$ in the aqueous ferrous salt solution is heated at 45° C. to 100° C., an oxygen-containing gas is passed through the suspension to oxidize the ferrous hydroxide colloid and form a suspension containing spherical magnetite particles according a magnetite-forming reaction. An aqueous solution containing an Mn compound in such an amount that Mn is present in an amount of 8 to 150 atomic % based on a total amount of Fe in the aqueous system and more than one equivalent of an aqueous alkali hydroxide solution based on the Mn compound and residual $Fe^{2+}$ are added to the obtained spherical suspension containing the magnetite particles. Thereafter, the resultant suspension is heat-oxidized under the same conditions as those of the afore-mentioned magnetite-forming reaction to coat hydroxide of Mn or hydroxides of Mn and Fe on a surface of each spherical magnetite particle. The thus-obtained spherical magnetite particles coated with the hydroxide of Mn or the hydroxides of Mn and Fe are filtered out, washed with water and dried, and then calcined at a temperature of 750° C. to 1,000° C. to obtain the afore-mentioned spherical particles.

Next, various conditions required for the production of Mn-containing granular particles after calcination, composed primarily of Fe and having a hematite structure are described in detail.

As the aqueous ferrous salt solutions, there can be used an aqueous ferrous sulfate solution, an aqueous ferrous chloride solution or the like.

As the manganese compounds, there can be used manganese sulfate, manganese chloride or the like. In order to uniformly coat the Mn compounds over a surface of each magnetite particle, it is preferred that these Mn compounds be used in the form of an aqueous solution.

As the aqueous alkali hydroxide solutions, there can be used an aqueous sodium hydroxide solution, an aqueous potassium hydroxide solution or the like.

The octahedral magnetite particles may also be produced, for example, according to the following method:

An aqueous solution having a pH of not less than 10 and containing $Fe(OH)_2$ colloid which is obtained by adding a basic substance or an aqueous solution thereof to an aqueous acidic solution containing ferrous salt such as ferrous sulfate in an amount of 0.98 to 1.3 equivalent based on acid radicals contained in the aqueous acidic solution, is subjected to oxidation reaction while maintaining the solution at a temperature of 45° C. to 70° C. and stirring it to cause precipitate particles present in the solution to be sufficiently moved therein, thereby obtaining as a raw material of a distinct red iron oxide, black ferromagnetic precipitate particles having a particle size of 0.2 to 0.1 tm and a granular or cubic shape which shows relatively less shape-anisotropy.

In the method (1) for the production of the Mn-containing octahedral particles composed primarily of Fe and having a hematite structure, the amount of the aqueous alkali hydroxide solution used is in the range of 1.01 to 1.3 equivalent based on $Fe^{2+}$ in the aqueous ferrous salt solution. When the amount of the aqueous alkali hydroxide solution used is less than 1.01 equivalent, it is difficult to control a ratio of the alkali added. In the worse case, the equivalent ratio thereof becomes less than 1.0, and further there arises difficulties in controlling sizes of the particles or the like. On the other hand, when the amount of the aqueous alkali hydroxide solution used is more than 1.3, acicular goethite particles may be mixed in the magnetite particles.

In the method (1), the reaction temperature is in the range of 45° C. to 100° C. When the reaction temperature is less than 45° C., there may be caused such a risk that the acicular goethite particles are mixed in the magnetite particles. On the other hand, when the reaction temperature is more than 100° C., the production process may become expensive though octahedral magnetite particles can be obtained at such a temperature.

The amount of Mn added to form a coating layer formed of the hydroxide of Mn or the hydroxides of Mn and Fe over a surface of each octahedral magnetite particle is in the range of 8 to 150 atomic % based on the total amount of Fe in the suspension. When the amount of Mn is less than 8 atomic %, the obtained particles cannot sometimes show a required degree of blackness though non-magnetic pigment can be produced. On the other hand, even though the amount of Mn is more than 150 atomic %, the addition of such an excess amount of Mn no longer contributes to increase in blackness of the particles because the degree of blackness is already saturated. The amount of Mn added is preferably in the range of 10 to 100 atomic %, more preferably 15 to 50 atomic % based on the total amount of Fe in the suspension.

In addition, if required, $Fe^{2+}$ may be added together with Mn to facilitate coating of Mn over the surface of each magnetite particle. The amount of $Fe^{2+}$ added to the suspension is usually less than 25 atomic % based on the total amount of Fe in the suspension. Even when the amount of $Fe^{2+}$ added is not less than 25 atomic %, the non-magnetic black pigment can be obtained but the degree of blackness thereof may be rather deteriorated.

Incidentally, in the method (1), as the $Fe^{2+}$ compounds added, there may be suitably used the same compounds as those contained in the aqueous ferrous salt solution used for the production of the magnetite particles. In the coating treatment, an aqueous alkali hydroxide solution can be further added to the suspension. In addition, the conditions for the coating treatment such as a treating temperature may be the same as used for the production of the magnetite particles.

The spherical magnetite particles may also be produced, for example, according to the following method comprising:

While an aqueous ferrous salt reaction solution containing ferrous hydroxide colloid which is obtained by reacting an aqueous ferrous salt solution with 0.80 to 0.99 equivalent of alkali hydroxide based on $Fe^{2+}$ in the aqueous ferrous salt solution, is heated at 30° c. to 100° C., an oxygen-containing gas is passed through the reaction solution to produce spherical magnetite particles; and alkali hydroxide is added to the resultant solution containing the magnetite particles in an amount of not less than 1.00 equivalent based on residual $Fe^{2+}$ after completion of the above-mentioned reaction, and then the suspension is heat-oxidized under the same conditions as used in the above.

In the method (2) for the production of the Mn-containing spherical particles composed primarily of Fe and having a hematite structure, the amount of the aqueous alkali hydroxide solution is in the range of 0.80 to 0.99 equivalent based on $Fe^{2+}$ in the aqueous ferrous salt solution. When the amount of the aqueous alkali hydroxide solution is less than 0.80 or more than 0.99, it sometimes become difficult to obtain magnetite particles having a spherical shape.

Further, in the method (2), the reaction temperature is in the range of 45° C. to 100° C. When the reaction temperature is less than 45° C., acicular goethite particles may be mixed in the magnetite particles. On the other hand, when the reaction temperature is more than 100° C., the production process becomes expensive though spherical magnetite particles can be obtained.

The amount of Mn added to the suspension so as to be coated over a surface of each spherical magnetite particle is in the range of 8 to 150 atomic % based on the total amount of Fe in the suspension. When the amount of Mn is less than 8 atomic %, the obtained particles cannot sometimes show a required degree of blackness though non-magnetic pigment can be produced. On the other hand, even though the amount of Mn is more than 150 atomic %, the addition of such an excess amount of Mn no longer contributes to increase in blackness of the particles because the degree of blackness is already saturated. The amount of Mn added to the suspension is preferably in the range of 10 to 100 atomic %, more preferably 15 to 50 atomic % based on the total amount of Fe in the suspension.

The amount of the alkali hydroxide added to form a coating layer formed of the hydroxide of Mn or the hydroxides of Mn and Fe over a surface of each spherical magnetite particle is more than 1.00 equivalent based on the sum of the Mn compound added and the residual $Fe^{2+}$ in the suspension. When the amount of the alkali hydroxide is less than 1.00 equivalent, Mn and $Fe^{2+}$ cannot be completely precipitated, so that it is difficult to form a uniform coating layer over the surface of each spherical magnetite particle. In view of economy, the amount of the alkali hydroxide is preferably in the range of 1.01 to 1.3 equivalent.

Incidentally, in the method (2), as the aqueous alkali hydroxide solution added, there may be suitably used the same aqueous alkali hydroxide solution as those used for the production of the magnetite particles. In the coating treatment, an aqueous alkali hydroxide solution can be further added to the suspension. In addition, the conditions for the coating treatment such as a treating temperature may be the same as those used for the production of the magnetite particles.

The oxidation can be carried out by passing an oxygen-containing gas, for example, air through the suspension to be reacted. Especially, reactors having an agitating function can be preferably used.

The thus-obtained magnetite particles coated with the hydroxide of Mn or the hydroxides of Mn and Fe are then heated at a temperature of 750° C. to 1,000° C. to obtain non-magnetic Mn-containing black particles composed primarily of Fe and having a hematite structure. When the temperature is less than 750° C., the degree of blackness of the resultant particles is insufficient. On the other hand, when the temperature is more than 1,000° C., the sizes of the resultant particles become too large, so that the tinting strength thereof cannot be exhibited.

Incidentally, the calcining treatment of the particles may be carried out in air. By calcining the magnetite particles in air, the magnetite particles can be oxidized and transformed into particles having a hematite structure.

Also, metal compounds containing Si, Al, P, B, Cu, Zn, Cr, Co, Sn, Cd, V, Mo or the like may be added to the reaction system used in the afore-mentioned methods (1) and (2) at any time before or during the reaction. Alternatively, the afore-mentioned metal compounds may be coated over a surface of each of the magnetite particles coated with the hydroxide of Mn or the hydroxides of Mn and Fe or may conduct the treatment for preventing that the particles are sintered.

The thus-prepared Mn-containing granular particles after calcination, composed primarily of Fe and having a hematite structure are subjected to dry coarse pulverization process to loosen the coarse particles contained therein, and then formed into a slurry. The slurry is then subjected to a wet pulverization process to further loosen the coarse particles therein. The wet pulverization process can be conducted by using a ball mill, a sand grinder, dyno mill, a colloid mill or the like such that the coarse particles having a particle size of not less than 44 µm do not substantially exist in the slurry. The slurry subjected to the wet pulverization process contains coarse particles having a particle size of not less than 44 µm in an amount of not more than 10% by weight, preferably not more than 5% by weight, more preferably 0% by weight based on the weight of the Mn-containing particles in the slurry. If the coarse particles having a particle size of not less than 44 gm remain in the slurry in an amount of more than 10% by weight, satisfactory effects cannot be obtained in the subsequent process, i.e., the treatment by the aqueous alkali solution.

In the alkali heat-treatment according to the present invention, the aqueous alkali solution such as an aqueous sodium hydroxide solution is added to the slurry containing the Mn-containing granular particles after calcination, composed primarily of Fe and having a hematite structure, from which coarse particles have been removed in the preceding process, to adjust the pH thereof to not less than 13. Thereafter, the slurry is heat-treated at a temperature of not less than 80° C.

The concentration of the Mn-containing granular particles after calcination, composed primarily of Fe and having a hematite structure in the alkaline suspension having a pH of not less than 13, is preferably a concentration of 50 to 250 g/liter.

When the pH of the alkaline suspension containing the Mn-containing granular particles after calcination, composed primarily of Fe and having a hematite structure is less than 13, the soluble sodium salt, the soluble sulfate or the like present in the interior or on the surface of the particles cannot be sufficiently washed out of the particles. The upper limit of the pH of the alkaline suspension is about 14. In view of the effect for washing out alkali such as sodium adhered to the surface of each particle during the treatment by the aqueous alkaline solution, the pH of the alkaline suspension is preferably in the range of 13.1 to 13.8.

The alkaline suspension having a pH of not less than 13 and containing the Mn-containing granular particles after calcination, composed primarily of Fe and having a hematite structure is preferably heated at a temperature of not less than 80° C., more preferably 90° C. When the temperature is less than 80° C., the soluble sodium salt, the soluble sulfate or the like present in the interior or on the surface of each particle cannot be sufficiently washed out. The upper limit of the temperature for heating the alkaline suspension is preferably 103° C., more preferably 100° C. When the temperature is more than 103° C., an autoclave or the like is required, or the suspension heat-treated is caused to be boiled under a normal pressure, which is disadvantageous for industrial applications.

The particles treated in the aqueous alkaline solution is filtered out and washed with water by ordinary methods to remove therefrom the soluble sodium salt or the soluble sulfate washed out of the interior or surface of each particle or alkalis such as sodium which have been adhered to the surface of each particle during the treatment by the aqueous alkali solution. The thus-treated particles are then dried.

As the washing methods, there can be exemplified a washing method using decantation, a washing method conducted according to a dilution method in which a filter thickener is used, a washing method in which water is supplied into a filter press or other ordinarily used industrial washing methods.

Incidentally, by washing out the soluble sodium salt or the soluble sulfate present in the interior of each of the Mn-containing granular particles composed primarily of Fe and having a hematite structure at this stage, even if the soluble sodium salt or the soluble sulfate is adhered to the surface of each particle in subsequent processes, for example, in the coating process described hereinafter, these soluble salts adhered can be readily removed therefrom by washing.

The particles heat-treated in the aqueous alkali solution is filtered and washed with water by ordinary methods, and if necessary, thereafter coated with at least one material selected from the group consisting of hydroxides of aluminum, oxides of aluminum, hydroxides of silicon and oxides of silicon.

The optional coating treatment according to the present invention can be carried out by adding an aluminum compound, a silicon compound or both the compounds to the aqueous suspension which is obtained by dispersing a cake, a slurry or dried particles of the particles heat-treated in the aqueous alkaline solution in an aqueous solution, while stirring; and adequately adjusting the pH of the suspension, if required. By such a coating treatment, the hydroxides of aluminum, the oxides of aluminum, the hydroxides of silicon or the oxides of silicon can be deposited on the surface of each of the afore-mentioned particles. Successively, the thus-coated particles are filtered, washed with water, dried and pulverized. These particles may be further subjected to degassing, compaction treatments or the like, if required.

As the aluminum compounds added during the coating treatment, there can be used aluminum salts such as aluminum acetate, aluminum sulfate, aluminum chloride or aluminum nitride, alkali aluminates such as sodium aluminate, alumina sol or the like.

The amount of the aluminum compound added may be in the range of 0.01 to 50.00% by weight (calculated as Al), based on the weight of the particles heat-treated in the aqueous alkaline solution. When the amount of the aluminum compound added is less than 0.01% by weight, the particles are sometimes unsatisfactorily dispersed in the vehicle. On the other hand, when the amount of the aluminum compound added is more than 50.00% by weight, the effect by coating of the aluminum compound is saturated and therefore no further increase in the effect cannot be expected.

As the silicon compounds added during the aforementioned coating treatment, there can be used water-glass No. 3, sodium orthosilicate, sodium metasilicate, colloidal silica or the like.

The amount of the silicon compound added may be in the range of 0.01 to 50.00% by weight (calculated as $SiO_2$), based on the weight of the particles heat-treated in the aqueous alkaline solution. When the amount of the silicon compound added is less than 0.01% by weight, the particles are sometimes unsatisfactorily dispersed in the vehicle. On the other hand, when the amount of the silicon compound added is more than 50.00% by weight, the effect by coating of the silicon compound is saturated and therefore no further increase in the effect cannot be expected.

In the case where both the aluminum and silicon compounds are used in combination, the total amount of these aluminum and silicon compounds added is preferably in the range of 0.01 to 50.00% by weight (calculated as the sum of Al and $SiO_2$), based on the weight of the particles heat-treated in the aqueous alkaline solution.

Non-magnetic black pigment according to the present invention comprises (1) the non-magnetic black particles having a hematite structure and containing Fe as a main element, which contain manganese in an amount of 5 to 40% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 10.0 μm and a pH of not less than 5.5; or (2) non-magnetic black particles comprising as core particles the non-magnetic black particles having a hematite structure and containing Fe as a main element, which contain manganese in an amount of 5 to 40% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 10.0 μm and a pH of not less than 5.5, and a coating layer formed on surfaces of said core particles and comprising at least one selected from the group consisting of hydroxides of aluminum, oxides of aluminum, hydroxides of silicon and oxides of silicon.

Next, the paint according to the present invention is described in detail.

In the paint according to the present invention, the non-magnetic black pigment may be blended therein in an amount of 0.1 to 200 parts by weight based on 100 parts by weight of a paint base material. In view of easiness in handling the paint, the amount of the non-magnetic black pigment blended therein is preferably in the range of 0.1 to 100 parts by weight, more preferably 0.1 to 50 parts by weight.

The paint base material according to the present invention comprises a resin, a solvent and if required, other additives such as a loading pigment, a drying agent, a surfactant, a hardening accelerator or other assistants.

Examples of the resins used in the paint base material, may include those resins ordinarily used for solvent-based paints, such as acrylic resins, alkyd resins, polyester resins, polyurethane resins, epoxy resins, phenol resins, melamine resins, amino resins or the like, or those resins ordinarily used for water-based paints, such as water-soluble alkyd resins, water-soluble melamine resins, water-soluble acrylic resins, water-soluble urethane emulsion resins or the like.

Examples of the solvents contained in the paint base material may be include those solvents ordinarily used for the solvent-based paints, such as toluene, xylene, butyl acetate, methyl acetate, methyl-isobutyl-ketone, butyl Cellosolve, ethyl Cellosolve, butyl alcohol, aliphatic hydrocarbons or the like. As the solvents used for water-based paints, there can be used water, butyl Cellosolve, butyl alcohol or the like.

As anti-foaming agents which can also be added to the paint base material, commercially available products such as NOPCO 8034 (trade name), SN DEFOAMER 477 (trade name), SN DEFOAMER 5013 (trade name), SN-DEFOAMER 247 (trade name) and SN DEFOAMER 382 (trade name) (these products produced by SUN NOPCO Co., Ltd.), ANTI-FOAM 08 (trade name) and EMULGEN 903 (trade name) (both products produced by KAO Co., Ltd.) or the like can be used.

A non-magnetic black paint containing the non-magnetic black pigment according to the present invention has a hue represented by the $L^*$ value of 15 to 25, the $a^*$ value of $-2.5$ to 2.5 and the $b^*$ value of $-2.5$ to 2.5, when formed into coating films, as described in Examples hereinafter. This indicates that the non-magnetic black paint according to the present invention shows a sufficient degree of blackness identical to those of paints containing conventional black pigments. The non-magnetic black paint according to the present invention also shows not less than 80% of a gloss, not more than 8.0 of an acid resistance ($\Delta G$) of the coating film obtained using non-magnetic black paint when measured by the method defined in Examples hereinafter, and not more than 1.0 of a ratio of change of hue ($\Delta L^*$). In view of the hue of the paint, the $L^*$ value is preferably in the range of 17 to 24, more preferably 20 to 23; the $a^*$ value is preferably in the range of $-2.5$ to 2.0, more preferably $-2.0$ to 1.0; and the $b^*$ value is preferably in the range of $-2.5$ to 2.0, more preferably $-2.0$ to 1.0. The gloss of the paint is preferably not less than 83%, more preferably not less than 85%. The acid resistance ($\Delta G$) of the coating film is preferably not more than 7.0, more preferably not more than 6.0. Further, the ratio of change of hue ($\Delta L^*$) of the coating film is preferably not more than 0.8, more preferably not more than 0.6.

Next, the rubber or resin composition according to the present invention is described in detail.

In the rubber or resin composition according to the present invention, the non-magnetic black pigment may be blended therein in an amount of 0.01 to 200 parts by weight based on 100 parts by weight of a constituent base material for the rubber or resin composition. In view of easiness in handling the rubber or resin composition, the amount of the non-magnetic black pigment blended therein is preferably in the range of 0.05 to 100 parts by weight, more preferably 0.1 to 50 parts by weight.

The constituent base material for the rubber or resin composition according to the present invention may contain a conventional rubber or thermoplastic resin and if required, other additives such as a lubricant, a plasticizer, an antioxidant, an ultraviolet light absorber or various other stabilizers.

The amount of the additive added is not more than 50% by weight based on the total weight of the non-magnetic black pigment and the rubber or the thermoplastic resin. When the amount of the additive added is more than 50% by weight, the moldability of the composition is deteriorated.

The rubber or resin composition according to the present invention can be used in the form of a molded product which is prepared by preliminarily intimately mixing the rubber or resin raw material and the non-magnetic black pigment with each other, applying an intense shearing force to the mixture while heating by using a kneader or an extruder to destroy aggregates of the black pigment and homogeneously disperse the non-magnetic black pigment in the rubber or the resin, and thereafter molding the resultant mixture into an aimed shape.

Also, as described in Examples hereinafter, the non-magnetic black rubber or resin composition containing the non-magnetic black pigment according to the present invention has a hue represented by the $L^*$ value of 15 to 25, the $a^*$ value of $-2.5$ to 2.5 and the $b^*$ value of $-2.5$ to 2.5. This indicates that the non-magnetic black rubber or resin composition according to the present invention shows a sufficient degree of blackness identical to those of rubber or resin compositions containing conventional black pigments. It is recognized by visual observation that the dispersibility of the black particles in these compositions is in the range of 4th to 5th ranks when evaluated by the method defined in Examples hereinafter. Further, the non-magnetic black rubber or resin compositions according to the present invention can show such an aging resistance that the percentage of discolored portion thereof when heated at 190° C. for 90 minutes, is not more than 15%. In view of the hue of the rubber or resin composition, the $L^*$ value is preferably in the range of 17 to 24, more preferably 20 to 24; the $a^*$ value is preferably in the range of $-2.5$ to 2.0, more preferably $-2.0$ to 1.0; and the $b^*$ value is preferably in the range of $-2.5$ to 2.0, more preferably $-2.0$ to 1.0. The aging resistance of the rubber or resin composition is preferably not more than 10%, more preferably not more than 5%.

Next, the magnetic recording medium according to the present invention is described in detail.

It is preferred that the non-magnetic black filler used in the magnetic recording medium according to the present invention comprises (1) non-magnetic black particles having a hematite structure and containing Fe as a main element, which contain manganese in an amount of 10 to 30% by weight based on the weight of the non-magnetic black particles, and have an average particle size of 0.1 to 0.5 $\mu$m and a geometrical standard deviation ($\sigma g$) of not more than 2.0; (2) non-magnetic black particles having a hematite structure and containing Fe as a main element, which contain manganese in an amount of 10 to 30% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 0.5 $\mu$m, a pH of not less than 5.5 and a geometrical standard deviation ($\sigma g$) of not more than 2.0; (3) non-magnetic black particles comprising as core particles the non-magnetic black particles having a hematite structure and containing Fe as a main element, which contain manganese in an amount of 10 to 30% by weight based on the weight of the non-magnetic black particles, and have an average particle size of 0.1 to 0.5 $\mu$m and a geometrical standard deviation ($\sigma g$) of not more than 2.0, and a coating layer formed on surfaces of said core particles and comprising at least one selected from the group consisting of hydroxides of aluminum, oxides of aluminum, hydroxides of silicon and oxides of silicon; or (4) non-magnetic black particles comprising as core particles the non-magnetic black particles having a hematite structure and containing Fe as a main element, which contain manganese in an amount of 10 to 30% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 0.5 μm, a pH of not less than 5.5 and a geometrical standard deviation (σg) of not more than 2.0, and a coating layer formed on surfaces of said core particles and comprising at least one selected from the group consisting of hydroxides of aluminum, oxides of aluminum, hydroxides of silicon and oxides of silicon.

The magnetic recording medium according to the present invention comprises a non-magnetic substrate, and a magnetic layer formed on the non-magnetic substrate and comprising 100 parts by weight of the magnetic particles, 5 to 30 parts by weight, preferably 7 to 25 parts by weight of the binder resin based on 100 parts by weight of the magnetic particles and 1 to 30 parts by weight, preferably 5 to 20 parts by weight of the above-mentioned non-magnetic black filler based on 100 parts by weight of the magnetic particles.

The magnetic recording medium according to the present invention has magnetic properties such as a saturation magnetization of 1,000 to 5,000 Gauss, preferably 1,500 to 5,000 Gauss, a residual magnetic flux density of 900 to 4,500 Gauss, preferably 1,000 to 4,500 Gauss, and a coercive force of 300 to 3,000 Oe, preferably 500 to 2,500 Oe.

The signal recording property of the magnetic recording medium according to the present invention is not less than 0.5 dB, preferably 0.7 dB at a recording frequency of 1 MHz; and not less than 0.5 dB, preferably 0.7 dB at a recording frequency of 4 MHz, as relative values obtained when the magnetic tape prepared in Comparative Examples 34 is regarded as a reference tape.

The magnetic recording medium according to the present invention shows a linear absorption coefficient of not less than 1.0, preferably not less than 1.2, when measured at a wave-length (λ) of 900 nm.

The durability of the magnetic recording medium according to the present invention is not less than 10 minutes, preferably not less than 15 minutes, more preferably not less than 20 minutes, still more preferably not less than 25 minutes, when measured according to the method defined in Examples hereinafter.

Next, the method for the production of the magnetic recording medium according to the present invention is described in detail.

The magnetic recording medium according to the present invention can be produced by applying a coating material comprising 100 parts by weight of the magnetic particles, 5 to 30 parts by weight, preferably 7 to 25 parts by weight of the binder resin, 1 to 30 parts by weight, preferably 5 to 20 parts by weight of the non-magnetic black filler comprising non-magnetic black particles, and if required, other additives, on the non-magnetic substrate according to an ordinary method, to form a magnetic layer thereon; and then subjecting the magnetic layer to magnetic orientation.

Examples of the magnetic particles used in the magnetic recording medium according to the present invention may include magnetic iron oxide particles such as maghemite particles (γ-$Fe_2O_3$), magnetite particles ($FeOx.Fe_2O_3$: 0<x≦1) or the like, magnetic iron oxide particles in which other elements than Fe, such as Co, Al, Ni, P, Zn, Si, B or the like are incorporated into the afore-mentioned magnetic iron oxide particles, magnetic iron oxide particles in which Co or the like is coated on surfaces of the afore-mentioned magnetic iron oxide particles, magnetic iron-based alloy particles, magnetic iron-based alloy particles containing Co, Al, Ni, P, Zn, Si, B or the like, plate-like Ba-, Sr- or Ba-Sr-ferrite particles, plate-like composite ferrite particles in which a coercive force-decreasing agent, e.g., divalent metals such as Co, Ni, Zn or the like or tetravalent metals such as Ti, Sn, Zr or the like is incorporated into the afore-mentioned plate-like ferrite particles, or the like.

The magnetic particles may be of any shape such as an acicular shape, a spindle shape, a cubic shape, a granular shape, a spherical shape, a plate-like shape or the like.

The magnetic particles have a BET specific surface area of not less than 15 $m^2/g$. In view of the dispersibility in the vehicle, it is suitable that the upper limit of BET specific surface area of the magnetic particles is 80 $m^2/g$. The BET specific surface area of the magnetic particles is preferably in the range of 15 $m^2/g$ to 60 $m^2/g$.

The non-magnetic black particles as the non-magnetic black filler used in the magnetic recording medium according to the present invention have a hematite structure as illustrated in the X-ray diffraction pattern of FIG. 4.

The non-magnetic black particles as the non-magnetic black filler according to the present invention have an average particle size of 0.1 to 0.5 μm, preferably 0.15 to 0.4 μm, and are preferably a granular shape in view of the dispersibility in the vehicle. The BET specific surface area of the non-magnetic Mn-containing black particles is in the range of 1 to 50 $m^2/g$, preferably 2 to 30 $m^2/g$.

The Mn content of the non-magnetic black particles as the non-magnetic black filler is in the range of 10 to 30% by weight, preferably 15 to 25% by weight based on the weight of the non-magnetic black particles as the non-magnetic black filler. When the Mn content is less than 10% by weight, the non-magnetic black particles as the non-magnetic black filler do not sometimes show a sufficient degree of blackness for the magnetic recording medium. On the other hand, when the Mn content is more than 30% by weight, it is disadvantageous from the standpoint of industrial applications though required blackness of the particles can be obtained.

The non-magnetic black particles as the non-magnetic black filler may have on surfaces thereof a coating layer comprising at least one selected from the group consisting of oxides of aluminum, hydroxides of aluminum, oxides of silicon and hydroxides of silicon.

In this case, the Si content of the coating layer is usually not more than 50% by weight, preferably in the range of 0.01 to 50% by weight, more preferably 0.05 to 20% by weight (calculated as $SiO_2$) based on the weight of the non-magnetic black particles. The Al content of the coating layer is usually not more than 50% by weight, preferably in the range of 0.01 to 50% by weight, more preferably 0.05 to 20% by weight (calculated as Al) based on the weight of the non-magnetic black particles.

Incidentally, when the non-magnetic black particles having the afore-mentioned coating layer is used as the non-magnetic black filler, the durability of the magnetic recording medium can be further enhanced.

The non-magnetic black particles as the non-magnetic black filler have such a degree of blackness when measured by colorimetry, i.e., a hue represented by the L* value of usually 0 to 30.0, preferably 10 to 25, the a* value of usually −2.5 to 6, preferably −1.0 to 6.0, and the b* of usually −3.0 to 10.0, preferably −2.5 to 2.0. Also, the non-magnetic black particles coated with at least one material selected from the group consisting of hydroxides of aluminum, oxides of aluminum, hydroxides of silicon and oxides of silicon as the non-magnetic black filler have approximately same values of L*, a* and b* mentioned above.

Incidentally, even though the non-magnetic black particles having the afore-mentioned coating layer is used as the black filler, the degree of blackness of the black filler remains unchanged.

Further, the non-magnetic black particles as the non-magnetic black filler having the following properties in addition to those mentioned above can be more suitably used as the non-magnetic black filler for the magnetic recording medium according to the present invention.

The non-magnetic black particles as the non-magnetic black filler, may have a pH of not less than 5.5. When the pH of the non-magnetic black particles is less than 5.5, a large amount of residual acidic impurities may be present between the particles and may form a cross-linked structure therebetween, thereby inhibiting the particles from being dispersed in the vehicle. In view of the dispersibility in the vehicle, the pH of the non-magnetic black particles is preferably not less than 6.5, more preferably not less than 8.0. The upper limit of the pH of the non-magnetic black particles is preferably 12, more preferably 11, still more preferably 10.

The non-magnetic black particles as the non-magnetic black filler having a hematite structure according to the present invention have a soluble sodium salt content of not more than 500 ppm (calculated as Na). When the soluble sodium salt content is more than 500 ppm, impurities including the soluble sodium salt may form the cross-linked structure between the particles, thereby deteriorating the dispersibility of the particles in the vehicle. In view of the dispersibility of the non-magnetic black particles in the vehicle, the soluble sodium salt content is preferably not more than 450 ppm, more preferably not more than 400 ppm, still more preferably not more than 300 ppm. From the standpoint of industrial properties such as productivity, the lower limit of the soluble sodium salt content is in the order of 0.01 ppm.

The non-magnetic black particles as the non-magnetic black filler having a hematite structure according to the present invention have a soluble sulfate content of not more than 200 ppm (calculated as $SO_4$). When the soluble sulfate content is more than 200 ppm, impurities including the soluble sulfate salt may form the cross-linked structure between the particles, thereby deteriorating the dispersibility of the particles in the vehicle. In view of the dispersibility of the non-magnetic black particles in the vehicle, the soluble sodium salt content is preferably not more than 170 ppm, more preferably not more than 150 ppm. From the standpoint of industrial properties such as productivity, the lower limit of the soluble sulfate salt content is in the order of 0.01 ppm.

The non-magnetic black particles as the non-magnetic black filler having a hematite structure according to the present invention may have such a degree of blackness as described in Examples hereinafter, i.e., a hue as represented by the L* value of usually 0 to 30, the a* value of usually −2.5 to 6.0 and the b* value of usually −3.0 to 10.0. In view of the hue of the particles, the L* value is preferably in the range of 5 to 30, more preferably 10 to 25; the a* value is preferably in the range of −1.0 to 6.0, more preferably −1.0 to 2.5; and the b* value is preferably in the range of −2.5 to 2.5, more preferably −2.5 to 2.0. Also, the non-magnetic black particles coated with at least one material selected from the group consisting of hydroxides of aluminum, oxides of aluminum, hydroxides of silicon and oxides of silicon as the non-magnetic black filler have approximately same values of L*, a* and b* mentioned above.

The magnetic recording medium of the present invention comprises a non-magnetic substrate, and a magnetic recording layer formed on the non-magnetic substrate.

The magnetic recording layer in the magnetic recording medium of the present invention is produced by applying a magnetic coating material comprising magnetic particles, a binder resin and a solvent onto the non-magnetic substrate, and drying the coating material. The film thickness of the magnetic recording layer is preferably 0.01 to 10.0 μm, more preferably 0.05 to 5.0 μm.

The non-magnetic substrates used for the magnetic recording medium according to the present invention may be used films made of synthetic resins such as polyethylene terephthalate, polyethylene, polypropylene, polycarbonates, polyethylene naphthalate, polyamides, polyamide-imides, polyimides or polysulfones, foils or plates made of metals such as aluminum or stainless steel, various papers, or the like.

The binder resins for the magnetic recording medium according to the present invention may be used vinyl chloride/vinyl acetate-based copolymers, a vinyl chloride/vinyl acetate/maleic anhydride copolymers, polyvinylidene chloride resins, polyurethane-based copolymers, styrene/butadiene copolymers, a butadiene/acrylonitrile copolymers, polyvinyl butyral resins, cellulose derivatives such as nitro-cellulose, polyester resins, synthetic rubber-based resins such as polybutadiene, epoxy resins, polyamide resins, polyisocyanate polymers, electron radiation curing-type acrylic urethane resins or a mixture thereof. Each of these resin binders may has an anchor group such as —OH, —COOH, —$SO_3M$ —$OPO_2M_2$ and —$NH_2$, wherein M represents H, Na or K.

Examples of the usable solvent are methyl ethyl ketone, toluene, cyclohexanone, methyl isobutyl ketone and tetrahydrofuran.

Further, additives ordinarily used for the production of magnetic recording media can also be used in the magnetic recording medium according to the present invention. Examples of these additives may include a lubricant, an abrasive, an anti-static agent, a colorant or the like.

The magnetic coating material used for the production of the magnetic recording medium according to the present invention can be intimately mixed and dispersed by a kneader such as a twin-screw kneader, a twin-screw extruder, a pressure kneader, a two-roll mill or a three-roll mill, and by a dispersing apparatus such as a ball mill, a sand grinder, atriter, disper, a homonizer or an ultrasonic dispersing apparatus.

The coating of the magnetic coating material according to the present invention can be carried out by using a gravure coater, a reverse-roll coater, a slit coater, a die coater or the like. The non-magnetic substrate coated with the magnetic coating material is then subjected to magnetic orientation such as magnetic orientation using opposed magnets, magnetic orientation using a solenoid or the like.

The important factor of the non-magnetic black particles for pigment according to the present invention lies in that the non-magnetic black particles composed primarily of Fe, and having a hematite structure and an average particle size of 0.1 to 10 μm; which have an Mn content of 5 to 40% by weight based on the weight of Fe and a pH of not less than 5.5, and contains not more than 500 ppm of a soluble sodium salt (calculated as Na), and not more than 200 ppm of a soluble sulfate (calculated as $SO_4$), and show an excellent blackness, an excellent heat resistance and an excellent dispersibility.

The reason why the non-magnetic black particles have an excellent degree of blackness is considered as follows. That is, in the case where Mn is unevenly dispersed in the hematite particles or contained only in a surface layer thereof, sufficient degree of blackness cannot be obtained. On the other hand, in the case where magnetite particles coated with hydroxide of Mn or hydroxides of Mn and Fe are calcined at a temperature of 750° C. to 1,000° C. to allow the magnetite to be oxidized and transformed into hematite and to allow the hydroxide of Mn coated to be diffused from the surface into the interior of the particles, the resultant particles can show an excellent degree of blackness. Accordingly, it is considered that the degree of blackness of the hematite particles is influenced by locations of Mn in the hematite structure.

It is suggested that the excellent heat resistance of the non-magnetic black particles composed primarily of Fe and having a hematite structure according to the present invention can be achieved by the calcination-treatment of these particles at an elevated temperature as high as not less than 750° C. upon production thereof.

Further, the reason why the non-magnetic black particles show an excellent dispersibility in the vehicle is considered as follows. That is, since the soluble sodium salt or the soluble sulfate which is derived from starting materials and causes a cross-linked structure between particles can be removed by alkali treatment, the cross-linked structure between particles is eliminated and coagulation of the particles is deflocculated, thereby improving the dispersibility of the particles in the vehicle.

Also, the important factors of the paint and the rubber or resin composition according to the present invention lie in that the paint and the rubber or resin composition containing the non-magnetic black particles composed primarily of Fe and having a hematite structure (Mn-containing particles) according to the present invention show not only an excellent degree of blackness and an excellent heat resistance but also an excellent acid resistance in the case of forming the coating film from the paint and an excellent aging resistance in the case of the rubber or resin composition.

The reasons why the coating film formed from the paint shows an excellent acid resistance and the rubber or resin composition shows an excellent aging resistance are considered as follows though it is not yet clearly known. That is, the reason is considered such that components which are contained in the black particles after the heat treatment and suppress the acid resistance and the aging resistance of the particles, for example, the soluble sodium salt or the soluble sulfate derived from starting materials, can be removed by the alkali treatment.

The magnetic recording medium according to the present invention can have a sufficient linear absorption coefficient even when the content of carbon black used in combination is reduced as described in Examples hereinafter. In addition, the magnetic coating layer of the magnetic recording medium is excellent in not only gloss and surface roughness but also squareness and magnetic orientation, and can show satisfactory durability. As described in Examples 6, 62 and 56 hereinafter, even if the content of the non-magnetic black particles added to the magnetic coating layer is increased from 7 parts by weight to 14 parts by weight and further to 21 parts by weight, the signal recording property of the magnetic recording medium can be prevented from being deteriorated, and the magnetic coating layer can show a satisfactory durability identical to that of $Al_2O_3$.

The reasons why the magnetic recording medium has the afore-mentioned advantageous properties are considered as follows.

That is, it is considered that since the non-magnetic black particles having an excellent blackness are used as the non-magnetic black filler, the magnetic recording medium can retain a sufficient linear absorption coefficient even though the content of carbon black used in combination therewith is reduced.

As described above, it is considered that in the magnetic recording medium according to the present invention, by the synergistic effect of reduction in the content of carbon black which deteriorates the dispersibility and an improvement of the dispersibility of the non-magnetic black particles, the dispersibility of magnetic particles in the vehicle is increased and in addition, the coating properties such as gloss and surface roughness, and the magnetic properties such as squareness and magnetic orientation are also enhanced.

The non-magnetic black pigment according to the present invention is suitably used as a colorant and a filler for paints and rubber or resin compositions due to excellent blackness, heat resistance and dispersibility thereof.

Since the paint according to the present invention contains the non-magnetic black pigment having the afore-mentioned excellent properties, a coating film exhibiting not only an excellent blackness but also a high acid resistance can be obtained.

In addition, since the rubber or resin composition according to the present invention contains the non-magnetic black pigment having the afore-mentioned excellent properties, there can be provided such a rubber or resin composition exhibiting not only an excellent blackness but also an excellent aging resistance.

In the magnetic recording medium according to the present invention, since the non-magnetic black particles which can prevent the deterioration of signal recording property even when the non-magnetic black particles are added in such an amount enough to enhance the durability, and which can reduce the content of carbon black used in combination therewith due to its excellent blackness, are used as the black filler, the magnetic recording medium have an excellent durability and a good signal recording property and is optimum for the purpose of high-density recording.

EXAMPLES

The present invention is described in more detail by examples, but these examples are only illustrative and therefore not intended to limit the scope of the invention.

Methods for measuring various contents and properties of particles according to the present invention are described below.

(1) Average particle size of black particle:

The electron photomicrograph having a magnification of ×20,000 was expanded by four times in each of the longitudinal and transverse directions to obtain an enlarged photomicrograph having a magnification of ×80,000. Particle sizes of 350 particles shown in the enlarged photomicrograph (×80,000) were measured along a predetermined direction. The average value of measured particle sizes was obtained as an average particle size of the black particles.

(2) Geometrical standard deviation (Ge) of particle diameters:

The particle diameters shown in the afore-mentioned enlarged photomicrograph were measured and calculated to obtain actual particle diameters and the number of particles involved in each particle size range. The actual particle diameters and the percentage of cumulative number (under integration sieve) of particles involved in each particle size range were respectively plotted on abscissa-axis and ordinate-axis of a logarithmic normal probability paper according to a statistical technique. The particles diameters respectively corresponding to the number of particles of 50% and 84.13% were read from the plotted graph. The geometrical standard deviation (σg) was calculated according to the following equation:

Geometrical Standard Deviation (σg) =

[particle diameter corresponding to the number of particles of 84.13% under integration sieve]/[particle diameter corresponding to the number of particles of 50% under integration sieve]

The smaller the geometrical standard deviation (σg), the more the excellent particle size distribution of the particle.

(3) Specific Surface Area:

The specific surface area of the particles were measured according to a BET method.

(4) Amounts of Mn. Al and Si:

The amounts of Mn, Al and Si present within the black particles or onto a surface thereof were measured according to JIS K 0119 "General rule of fluorescent X-ray spectroscopy" by using a fluorescent X-ray spectrometer 3063-type (manufactured by RIGAKU DENKI KOGYO Co., Ltd.).

(5) pH of Particles:

5 g of sample particles were weighed and charged into a 300 ml conical flask. 100 ml of pure water was added to the sample particles in the conical flask. The content of the conical flask was heated and maintained in a boiled state for 5 minutes. Thereafter, the conical flask was plugged and the content of the flask was allowed to stand until it was cooled down to ordinary temperature. The flask was opened and supplied with pure water in such an amount corresponding to reduction in weight of pure water in the flask. The flask was plugged again and shaken for 1 minute for mixing. After the content of the flask was allowed to stand for 5 minutes, the pH of the resultant supernatant was measured according to JIS Z 8802-7. The thus-obtained pH value was determined as the pH of the particles.

(6) Contents of Soluble Sodium Salt and Soluble Sulfate:

The supernatant prepared for the above pH measurement was filtered through a filter paper No. 5C. Amounts of $Na^+$ and $SO_4^{2-}$ were measured by an inductively-coupled plasma atomic emission spectrometer (manufactured by SEIKO DENSHI KOGYO Co., Ltd.).

(7) Hue of Black Particles:

0.5 g of sample particles and 0.7 cc of castor oil were intimately kneaded together by a Hoover's muller to form a paste. 4.5 g of clear lacquer was added to the paste and was intimately mixed to form a paint. The paint was coated on a cast-coated paper by means of a 6 mil applicator to prepare a coating piece (having a film thickness of about 30 am). The thus-prepared coating piece was measured according to JIS Z 8729 by a multi-light source spectrographic calorimeter MSC-IS-2D (manufactured by SUGA TESTING MACHINES MANUFACTURING CO., LTD.) to determine a colorimiteric indices of L* value, a* value and b* value thereof.

(8) Hue of Paint and Resin Composition Using Black Pigment:

Similarly, hues of the coating film formed from the below-mentioned paint and the resin plate formed from the below-mentioned resin composition were measured according to JIS Z 8729 by a multi-light source spectrographic colorimeter MSC-IS-2D (manufactured by SUGA TESTING MACHINES MANUFACTURING CO., LTD.) to determine a colorimiteric indices of L* value, a* value and b* value thereof.

Incidentally, the a* value represents a reddening effect and the larger the a* value, the stronger the reddening effect. The b* value represents a yellowing effect and the larger the b* value, the stronger the yellowing effect. The L* value represents a lightness.

(9) Heat Resistance of Black Pigment:

10 g of a sample particles were charged into a porcelain crucible and heat-treated at 500° C. for three hours by an electric furnace. After being allowed to stand for cooling, a hue of the sample particles (i.e., L* value, a* value and b* value) was measured and compared with that before the heat-treatment to determine an amount of change of hue thereof. Using the measured value before the heat-treatment as a reference value, the amount of change of hue represented by ΔE* was obtained according to the following formula:

$$\Delta E^* = \{(\Delta L^*)^2 + (\Delta a^*)^2 + (\Delta b^*)^2\}^{1/2}$$

wherein ΔL* represents a difference in L* value between before and after heat-treatment of the sample particles; Δa* represents a difference in a* value between before and after heat-treatment of the sample particles; and Δb* represents a difference in b* value between before and after heat-treatment of the sample particles.

Incidentally, the smaller the ΔE*, the less the change in hue of the sample particles and therefore, the sample particles have a higher heat resistance.

(10) Residue on Sieve after Wet Pulverization Process:

The concentration of the slurry before and after subjected to the wet pulverization process was measured. That is, the slurry containing a solid (black particles) of 100 g was passed through a sieve having a mesh size of 325 (sieve opening: 44 μm) to determine an amount of solid residue remaining on the sieve.

(11) Dispersibility of Black Pigment in Vehicle for Paint:

The same procedure as described in Examples hereinafter was conducted to form a coating film, and the gloss of a surface thereof was measured at an incident light angle of 20° by using a glossmeter UGV-5D (manufactured by SUGA TESTING MACHINES MANUFACTURING CO., LTD.). The higher the value of the gloss, the more excellent the dispersibility of the black pigment in the vehicle.

(12) Viscosity of Paint:

The viscosity at 25° C. of the paint prepared according to the below-mentioned procedure was measured by E-type viscometer (cone plate-type viscometer) EMD-R (manufactured by TOKYO KEIKI CO., LTD.). The viscosity was represented by the value at a shear rate (D) of 1.92 $sec^{-1}$.

(13) Dispersibility of Resin Composition:

The number of undispersed aggregate particles on a surface of the obtained resin composition were visually counted and evaluated by classifying into the following five ranks. The 5th rank represents most excellent dispersing condition.

Rank 5: No undispersed aggregate particles were recognized;

Rank 4: 1 to 4 undispersed aggregate particles per 1 $cm^2$ were recognized;

Rank 3: 5 to 9 undispersed aggregate particles per 1 $cm^2$ were recognized;

Rank 2: 10 to 49 undispersed aggregate particles per 1 $cm^2$ were recognized;

Rank 1: not less than 50 undispersed aggregate particles per 1 $cm^2$ were recognized.

(14) Acid Resistance:

The paint containing the black pigment prepared according to the procedure of the below-mentioned Examples, was coated on a cold-rolled steel plate (having a size of 0.8 mm×70 mm×150 mm: JIS G-3141) and then dried to form a coating film having a thickness of 150 μm thereon. The gloss and hue of the obtained coating film were measured. The coated steel plate was suspended with a thread and then was immersed by about 120 mm in depth into 5 wt. % aqueous sulfuric acid solution in a 1,000 cc beaker. The coated steel plate was allowed to stand in the suspended state at 25° C. for 24 hours.

Next, the coated steel plate was removed from the aqueous sulfuric acid solution and washed with flowing water. After water adhered was removed, gloss and hue of the coated steel plate were measured at a central portion of the coating film thereon. Based on the measured values of gloss and hue before and after the immersion, an amount of change of gloss (ΔG value) and an amount of change of hue (ΔL* value) were obtained. The degree of the acid resistance of the paint was evaluated by the obtained ΔG and ΔL* values. The smaller the ΔG value and the ΔL* value, the more excellent the acid resistance of the paint.

(15) Aging Resistance:

A colored resin plate molded from a resin composition in which the black pigment prepared in below-mentioned Examples were mixed and kneaded, was heated at 190° C. for respective 30 minutes, 60 minutes and 90 minutes to measure a surface area S of discolored portion thereof due to deterioration of the resin. The ratio of the discolored surface area S to a surface area $S_0$ (15 mm×15 mm=2.25 $cm^2$) of the resin plate before heating was determined and represented by the percentage of 5% increments.

That is, such a state that the percentage of $(S/S_0) \times 100$ is 0%, represents that no deterioration of resin was caused. On the other hand, the state that the percentage of $(S/S_0) \times 100$ is 100%, represents that an entire portion of the resin was deteriorated.

(16) Gloss of Surface of Coating Film as Magnetic Recording Layer:

The gloss on a surface of the magnetic recording layer was measured at an incident light angle of 45° by a glossmeter UGV-5D (manufactured by SUGA TESTING MACHINES MANUFACTURING CO., LTD.). The measured gloss was represented by a percentage (%) obtained when the gloss of a reference plate is regarded as 86.3%.

(17) Surface Roughness (Ra) of Magnetic recording Layer:

After forming a magnetic recording layer by calendar coating method, the surface roughness thereof was measured as a center-line average roughness by SURFCOM-575A (manufactured by TOKYO SEIMITSU CO., LTD.).

(18) Light Transmittance of Magnetic recording Layer:

The light transmittance of the magnetic recording layer at a wavelength (λ) of 900 nm relative to a reference base film was measured by a photoelectric spectrophotometer UV-2100 (manufactured by SIMAZU SEISAKUSHO CO., LTD.), and represented by a linear absorption coefficient which is defined by the following formula:

Linear Absorption Coefficient $(\mu m^{-1}) = \ln(1/t)/FT$ wherein t represents a light transmittance at wavelength (λ) of 900 nm; and FT represents a thickness (μm) of the magnetic recording layer of the magnetic recording medium.

The larger the value of the linear absorption coefficient, the less the light transmittance.

(19) Durability of Magnetic recording Layer:

The durability of the magnetic recording layer was measured by a media-durability tester MDT-3000 (manufactured by STEINBERG ASSOCIATES CORP.) at a relative speed of 16 m/sec under a load of 200 g.

(20) Magnetic Properties:

The magnetic properties of the magnetic recording layer was measured at a maximum external magnetic field of 10 kOe by a sample-vibration type magnetometer VSM-3S-15 (manufactured by TOEI KOGYO CO., LTD.).

(21) Signal Recording Property:

Using a drum tester BX-D-3168 (manufactured by BELDEX CO., LTD.), the signal recording outputs of the magnetic recording medium at frequencies of 1 MHz and 4 MHz, respectively, were measured at a relative speed of 5.8 m/sec and represented as relative values based on the value of the reference magnetic tape prepared in the below-mentioned Comparative Example 34.

(22) Surface Electrical Resistance of Magnetic recording Layer:

After exposed to the condition of a temperature of 25° C. and a relative humidity of 60% for not less than 12 hours, a coating film which was slit into a width of 6 mm, was disposed between metal electrodes each having a width of 6.5 mm. 170 g weights were fixed to opposite ends of the coating film so as to bring the coating film into close contact with each electrode. Thereafter, D.C. voltage of 500 V was applied between the metal electrodes to measure a surface electrical resistance of the coating film.

Example 1

<Production of Magnetite Particles>

210 liters of water and 60 liters of a 15.75N aqueous sodium hydroxide solution were charged into a reactor equipped with a stirrer. 300 liters of a 40 mol/liter aqueous ferrous sulfate solution was added to the aqueous solution in the reactor to adjust the pH thereof to not less than 13. The resultant aqueous solution was then heated at 85° C. to prepare an aqueous ferrous salt solution containing ferrous hydroxide.

Air was passed through the thus-prepared aqueous ferrous salt solution containing ferrous hydroxide at 90° C. and a feeding rate of 250 liter/min for 90 minutes to produce magnetite particles.

Next, 570 liters of the suspension containing 32.4 kg of the magnetite particles was mixed with 100 liters of a 1.4 mol/liter aqueous ferrous sulfate solution, 100 liters of a 1.4 mol/liter aqueous manganese sulfate solution (the content of Mn corresponds to 20 atomic % based on the total amount of Fe and Mn) and 50 liters of a 11.2 N aqueous sodium hydroxide solution (corresponding to the amount required to neutralize Mn and $Fe^{2+}$ added), to adjust the pH of the mixed solution to not less than 13. Air was passed through the mixed solution at 90° C. and a feed rate of 700 liter/min for 180 minutes to produce magnetite particles coated with hydroxides of Mn and Fe. The coated magnetite particles were filtered, washed with water, dried and pulverized to obtain black particles.

Successively, the obtained black particles were passed through a continuous electric furnace having a ceramic core pipe to permit the black particles to be treated therein in air at 900° C. for an average residence time of 60 minutes, thereby obtaining black particles.

As shown in the electron photomicrograph (×20,000) of FIG. 1, the thus-obtained black particles had an average particle size of 0.30 μm, a geometrical standard deviation (σg) of 1.39 and a BET specific surface area of 3.8 m²/g. In addition, as a result of fluorescent X-ray analysis, the black particles had an Mn content of 13.8% by weight, a pH of 7.4, a soluble sodium salt content of 712 ppm (calculated as Na), and a soluble sulfate content of 856 ppm (calculated as $SO_4$). Further, the black particles had a hue represented by the L* value of 22.10, the a* value of 0.21 and the b* value of −1.31.

Also, as a result of the X-ray diffraction, a peak of hematite was recognized. With respect to the magnetic properties, the black particles showed a magnetization of 0.31 emu/g when applying an external magnetic field of 10 kOe thereto, which was approximately identical to that of hematite.

Further, the afore-mentioned black particles were tested to determine a heat-resistance thereof. The black particles after heat treatment had a hue represented by the L* value of 22.08, the a* value of 0.16 and the b* value of −1.26. When calculated using the afore-mentioned formula, the value of ΔE was 0.07. This indicated that the black particles had an excellent heat resistance.

<Alkali Heat Treatment of black Pigment>

Next, 20 kg of the obtained black particles were deflocculated in 150 liters of pure water using a stirrer and further passed through HOMOMIC-LINE mill (manufactured by TOKUSHU KIKA KOGYO CO., LTD.) three times to obtain a slurry of the black particles.

Successively, the obtained slurry was passed through transverse-type SGM (MIGHTY MILL manufactured by INOUE SEISAKUSHO CO., LTD.) five times while rotating a shaft thereof at 2,000 rpm. When passed through a sieve having a mesh size of 325 (sieve opening: 44 μm), the black particles in the thus-obtained slurry showed a residue on sieve of 0%.

The obtained slurry of the black particles was adjusted to a concentration of 100 g/liter. While stirring, 150 liters of the slurry was mixed with a 6 N aqueous sodium hydroxide solution to adjust the pH of the slurry to 13.1. Successively, while stirring, the slurry was heated to 95° C. and maintained at such temperature for 3 hours.

Next, the slurry was washed by a decantation method to obtain a slurry having a pH of 10.5. For precaution purpose, the concentration of the slurry was measured at this time, and as a result, the concentration of the slurry was 99 g/liter. 50 liters of the slurry was separated, filtered and dried to obtain non-magnetic black particles (A).

As seen from the electron photomicrograph (×20,000) shown in FIG. 2, the thus-obtained non-magnetic black particles (A) had an average particle size of 0.30 μm, a geometrical standard deviation (σg) of 1.39 and a BET specific surface area of 4.1 m²/g. In addition, as a result of fluorescent X-ray analysis, non-magnetic the black particles (A) had an Mn content of 13.7% by weight, a pH of 8.6, a soluble sodium salt content of 96 ppm (calculated as Na), and a soluble sulfate content of 32 ppm (calculated as $SO_4$). Further, the non-magnetic black particles had a heat resistance (ΔE) of 0.07 and a hue represented by the L* value of 22.12, the a* value of 0.19 and the b* value of −1.26.

Further, as a result of the X-ray diffraction, a peak of hematite was recognized. With respect to the magnetic properties, the black particles showed a magnetization of 0.36 emu/g when applying an external magnetic field of 10 kOe thereto, which was approximately identical to that of hematite.

Example 2

<Coating Treatment of Black Pigment>

After 100 liters of the slurry after the alkali heat-treatment in Example 1 was heated to 60° C., 3667 ml of a 1.0 mol/liter aqueous sodium aluminate solution (corresponding to 1.0% by weight (calculated as Al) based on the black particles) was added to the obtained slurry and the slurry was allowed to stand for 30 minutes. The slurry was supplied with acetic acid to adjusted the pH thereof to 8.0. After allowing to stand for 30 minutes in that state, 685.1 g of water glass No. 3 (corresponding to 2.0% by weight (calculated as $SiO_2$) based on the weight of the black particles) was added to the slurry. After allowing to stand for 30 minutes, the slurry was supplied with acetic acid again to adjust the pH thereof to 7.5. The slurry was then filtered, washed with water, dried and pulverized to obtain non-magnetic black particles (B) coated with hydroxide of aluminum and oxide of silicon.

As a result of the observation of the electron photomicrograph, the thus-obtained non-magnetic black particles (B) had an average particle size of 0.30 μm, a geometrical standard deviation (σg) of 1.39 and a BET specific surface area of 11.2 m²/g. In addition, as a result of fluorescent X-ray analysis, the non-magnetic black particles (B) had an Mn content of 13.5% by weight, an Al content of 0.97% by weight, a $SiO_2$ content of 1.93% by weight, a pH of 8.1, a soluble sodium salt content of 123 ppm (calculated as Na), and a soluble sulfate content of 78 ppm (calculated as $SO_4$). Further, the non-magnetic black particles had a heat resistance (ΔE value) of 0.1 and a hue represented by the L* value of 22.31, the a* value of 0.37 and the b* value of −1.31. Further, as a result of the X-ray diffraction, a peak of hematite was recognized.

Example 3

<Production of Paint Using Black Particles>

Using 10 g of each of the non-magnetic black particles (A) prepared in Example 1 and the non-magnetic black particles (B) prepared in Example 2, components for paint as shown below were blended together in 140 ml glass bottle. The components were intimately mixed and dispersed together with 90 g of 3 mmφ glass beads by a paint shaker for 90 minutes to prepare a mill base.

Composition of Mill Base:

| | |
|---|---|
| Black pigment (A) or (B) | 12.2 parts by weight |
| Amino-alkyd resin | 19.5 parts by weight |
| (AMILAC No. 1026 produced by KANSAI PAINT CO., LTD.) | |
| Thinner | 7.3 parts by weight |

Using the above-prepared mill base, components as shown below was blended together and further intimately mixed and dispersed by a paint shaker for 15 minutes to prepare a paint (A) containing the black pigment (A) comprising non-magnetic black particles (A) and a paint (B) containing the black pigment (B) comprising non-magnetic black particles (B).

Composition of Paints:

| | |
|---|---|
| Mill base | 39.0 parts by weight |
| Amino-alkyd resin | 61.0 parts by weight |
| (AMILAC No. 1026 produced by KANSAI PAINT CO., LTD.) | |

Next, the thus-obtained paints were respectively coated on a cold-rolled steel plate (having a size of 0.8 mm×70 mm×150 mm: JIS G-3141) to form a coating film having a thickness of 150 μm thereon.

The coating film prepared from the paint (A) had a gloss of 96%, and a hue represented by the L* value of 22.81, the a* value of 0.41 and the b* value of −1.49. Further, as a result of the test for acid resistance of the coating film, the amount of change of gloss (ΔG) was 3.8% and the amount of change of lightness (ΔL*) was 0.31.

Similarly, the coating film prepared from the paint (B) had a gloss of 105%, and a hue represented by the L* value of 22.76, the a* value of 0.37 and the b* value of −1.51. Further, as a result of the test for acid resistance of the coating film, the amount of change of gloss (ΔG) was 2.1% and the amount of change of lightness (ΔL*) was 0.10.

Example 4

<Production of Resin Composition Containing Black Pigment>

1.5 g of each of the non-magnetic black particles (A) prepared in Example 1 or the non-magnetic black particles (B) prepared in Example 2, and 48. 5 g of a polyvinyl chloride resin powder 103EP8D (produced by NIPPON ZEON CO., LTD.) were weighed and charged into a 100 cc beaker, and intimately mixed together by a spatula to obtain mixed particles.

0.5 g of calcium stearate was added to the mixed particles. The resultant mixed particles were intimately mixed and then slowly supplied to hot rolls heated to 160° C. whose clearance was adjusted to 0.2 mm, and continuously kneaded therebetween until a uniform resin composition was produced. The resin composition was separated from the hot rolls and used as a raw material for forming colored resin plates described hereinafter.

Next, the thus-produced resin composition was interposed between a pair of surface polished stainless steel plates, and placed within a hot press at 180° C. to subject the composition to a pressure molding while applying a pressure of 1 ton/cm² thereto, thereby obtaining colored resin plates (A) and (B) each having a thickness of 1 mm.

The thus-produced colored resin plate (A) had a dispersion state of the rank 5. The colored resin plate was cut into 1.5 cm-square test pieces. Three test pieces were placed in Geer oven maintained at 190° C. and removed therefrom one by one at intervals of 30 minutes to examine whether or not the resin of the test pieces was deteriorated. As a result, the test piece initially removed 30 minutes after initiation of the heating showed a degree of resin-deterioration ($S/S_0 \times 100$) of 0%, the test piece secondly removed 60 minutes after initiation of the heating showed a degree of resin-deterioration ($S/S_0 \times 100$) of 5%, and the test piece lastly removed 90 minutes after initiation of the heating showed a degree of resin-deterioration ($S/S_0 \times 100$) of 5%.

Similarly, the thus-produced colored resin plate (B) had a dispersion state of the rank 5. The colored resin plate was cut into 1.5 cm-square test pieces. Three test pieces were placed in Geer oven maintained at 190° C. and removed therefrom one by one at intervals of 30 minutes to examine whether or not the resin of the test pieces was deteriorated. As a result, the test piece initially removed 30 minutes after initiation of the heating showed a degree of resin-deterioration ($S/S_0 \times 100$) of 0%, the test piece secondly removed 60 minutes after initiation of the heating showed a degree of resin-deterioration ($S/S_0 \times 100$) of 0%, and the test piece lastly removed 90 minutes after initiation of the heating showed a degree of resin-deterioration ($S/S_0 \times 100$) of 0%.

Production Example 1

<Production of Black Filler>

Black particles were produced in the same manner as defined in Example 1 except that the calcining process was conducted at a temperature of 800° C. for 2 hours and no alkali treatment was conducted.

As shown in the electron photomicrograph (×20,000) of FIG. 3, the thus-obtained black particles had an average particle size of 0.28 μm. In addition, the black particles had an Mn content of 13.6% by weight as a result of fluorescent X-ray analysis, and showed a hue represented by the L* value (lightness) of 21.1, the a* value of 0.9 and the b* value of −1.2.

Also, as a result of the X-ray diffraction as shown in FIG. 4, only a peak of hematite was recognized.

The thus-produced black particles were used as a black filler for the production of a magnetic recording medium, as shown below.

Example 5

<Production of Magnetic Recording Medium>

100 parts by weight of Co-coated acicular maghemite ($\gamma$-$Fe_2O_3$) particles (having a major axis diameter of 0.25 μm; an aspect ratio (major axis diameter/minor axis diameter) of 7.0; a specific surface area of 31.6 m²/g; a coercive force of 682 Oe; a saturation magnetization of 79.6 emu/g; and a Co content of 2.69% by weight), 10.0 parts by weight of a vinyl chloride-based resin MR-110 (produced by NIPPON ZEON CO., LTD.), 23.3 parts by weight of cyclohexanone, 10.0 parts by weight of methyl ethyl ketone, 1.0 part by weight of carbon black particles (having a particle diameter of 26 nm and a BET specific surface area of 130 m²/g) (produced by MITSUBISHI CHEMICAL CORP.), and 7.0 parts by weight of the black particles prepared in Production Example 1 were mixed and kneaded together for 20 minutes by using a kneader. The mixture was diluted by adding 79.6 parts by weight of toluene, 110.2 parts by weight of methyl ethyl ketone and 17.8 parts by weight of cyclohexanone thereto, and then mixed and dispersed for 3 hours by a sand grinder.

The obtained mixture was further supplied with 33.3 parts by weight of a solution prepared by dispersing 10.0 parts by weight of a polyurethane resin as a solid content (product name: TI-1075 produced by SANYO KASEI KOGYO CO., LTD.) in mixed solvent containing methyl ethyl ketone and cyclohexanone at a weight ratio of 1:1, and further mixed and dispersed for 30 minutes by a sand grinder. Thereafter, the resultant mixture was filtered through a filter having a sieve opening of 1 μm. The obtained filter cake was mixed with 12.1 parts by weight of a solution prepared by dispersing 1.0 part by weight of myristic acid and 3.0 parts by weight of butyl stearate in mixed solvent composed of methyl ethyl ketone, toluene and cyclohexanone at a weight ratio of 5:3:2, and 15.2 parts by weight of a solution prepared by dispersing 5.0 parts by weight of trifunctional low-molecular weight polyisocyanate E-31 (produced by TAKEDA YAKUHIN KOGYO CO., LTD.) in mixed solvent containing methyl ethyl ketone (MEK), toluene and cyclohexanone at a weight ratio of 5:3:2, and was mixed while stirring to obtain a magnetic coating material having a viscosity of 2270 cP.

The thus-obtained magnetic coating material was filtered through a filter having a sieve opening of 1 μm. Thereafter, the magnetic coating material filtered was coated on a 14 μm-thick polyester base film by a slit coater having a gap width of 45 μm, and then dried to form a magnetic layer having a thickness of about 4 μm on the base film. After the magnetic layer was subjected to calendar treatment to flatten a surface thereof, the coated film was cut into a magnetic tape with ½ inch in width. The thus-obtained magnetic tape was placed within a curing oven and allowed to stand therein for 24 hours to cause the magnetic layer to be sufficiently cured, thereby obtaining a magnetic recording medium in the form of a magnetic tape.

With respect to magnetic properties, the obtained magnetic recording medium had a coercive force of 721 Oe, a residual magnetic flux density Br of 1,420 Gauss, a squareness (Br/Bm) of 0.88, a degree of orientation of 2.53, Further, the magnetic recording medium had a gloss of 172%, a surface roughness Ra of 6.8 nm, a linear absorption coefficient of 1.21 $\mu m^{-1}$, a signal recording property of +1.8 dB at a recording wavelength of 1 MHz and +1.6 dB at a recording wavelength of 4 MHz, a durability of not less than 30 minutes, and an electrical resistance of $5.0 \times 10^9$ $\Omega/cm^2$.

As is appreciated from the values of the gloss and the surface roughness Ra, it was recognized that the magnetic recording medium of this Example using the non-magnetic black particles had an excellent dispersibility.

Example 6

<Production of Magnetic Recording medium>

100 parts by weight of Co-coated acicular magnetite ($FeOx.Fe_2O_3$, $0<x\leq1$) particles (having a major axis diameter of 0.24 $\mu m$; an aspect ratio (major axis diameter/minor axis diameter) of 7.1; a specific surface area of 31.3 $m^2/g$; a coercive force of 714 Oe; a saturation magnetization of 83.1 emu/g; and a Co content of 2.26% by weight), 10.0 parts by weight of a vinyl chloride-based resin MR-110 (produced by NIPPON ZEON CO., LTD.), 23.3 parts by weight of cyclohexanone, 10.0 parts by weight of methyl ethyl ketone, 1.0 part by weight of carbon black particles (having a particle diameter of 26 nm and a BET specific surface area of 130 $m^2/g$) (produced by MITSUBISHI CHEMICAL CORP.), and 7.0 parts by weight of the non-magnetic black particles (A) having a hematite structure prepared in Example 1 or the non-magnetic black particles (B) having a hematite structure prepared in Example 2 were mixed and kneaded together for 20 minutes by a kneader. The mixture was diluted by adding 79.6 parts by weight of toluene, 110.2 parts by weight of methyl ethyl ketone and 17.8 parts by weight of cyclohexanone thereto, and then mixed and dispersed for 3 hours by a sand grinder to obtain mixed dispersions (A) and (B), respectively.

The mixed dispersion (A) and (B) were respectively supplied with 33.3 parts by weight of a solution prepared by dispersing 10.0 parts by weight of a polyurethane resin as a solid content (product name: TI-1075 produced by SANYO KASEI KOGYO CO., LTD.) in a mixed solvent containing methyl ethyl ketone and cyclohexanone at a weight ratio of 1:1, and further mixed and dispersed for 30 minutes by a sand grinder. Thereafter, each of the mixed dispersions was filtered through a filter having a sieve opening of 1 $\mu m$. The obtained filter cake was mixed with 12.1 parts by weight of a solution prepared by dispersing 1.0 part by weight of myristic acid and 3.0 parts by weight of butyl stearate in a mixed solvent composed of methyl ethyl ketone, toluene and cyclohexanone at a weight ratio of 5:3:2, and 15.2 parts by weight of a solution prepared by dispersing 5.0 parts by weight of trifunctional low-molecular weight polyisocyanate E-31 (produced by TAKEDA YAKUHIN KOGYO CO., LTD.) in a mixed solvent composed methyl ethyl ketone (MEK), toluene and cyclohexanone at a weight ratio of 5:3:2, and was mixed while stirring to obtain a magnetic coating material (A) having a viscosity of 2380 cP and a magnetic coating material (B) having a viscosity of 1970 cP.

The thus-obtained magnetic coating materials (A) and (B) were filtered through a filter having a sieve opening of 1 $\mu m$. Thereafter, the magnetic coating materials filtered were respectively coated on a 14 $\mu m$-thick polyester base film by a slit coater having a gap width of 45 $\mu m$, and then dried to form magnetic layers (A) and (B) each having a thickness of about 4 $\mu m$ on the respective base films. After the magnetic layer was subjected to calendar treatment according to an ordinary method to flatten a surface thereof, the coated film was cut into a magnetic tape with ½ inch width. The thus-obtained magnetic tape was placed within a curing oven and allowed to stand therein for 24 hours to cause the magnetic layers to be sufficiently cured, thereby obtaining magnetic tapes (A) and (B) for magnetic recording media.

With respect to magnetic properties, the obtained magnetic tape (A) had a coercive force of 743 Oe, a residual magnetic flux density Br of 1,560 Gauss, a squareness (Br/Bm) of 0.87, a degree of orientation of 2.56. Further, the magnetic tape (A) had a gloss of 180%, a surface roughness Ra of 6.8 nm, a linear absorption coefficient of 1.26 $\mu m^{-1}$, a signal recording property of +2.1 dB at a recording wavelength of 1 MHz and +2.1 dB at a recording wavelength of 4 MHz, a durability of not less than 30 minutes, and an electrical resistance of $5.0 \times 10^9$ $\Omega/cm^2$.

Similarly, with respect to magnetic properties, the obtained magnetic tape (B) had a coercive force of 746 Oe, a residual magnetic flux density Br of 1,582 Gauss, a squareness (Br/Bm) of 0.88, a degree of orientation of 2.63. Further, the magnetic tape (B) had a gloss of 187%, a surface roughness Ra of 6.2 nm, a linear absorption coefficient of 1.27 $\mu m^{-1}$, a signal recording property of +2.5 dB at a recording wavelength of 1 MHz and +2.7 dB at a recording wavelength of 4 MHz, a durability of not less than 30 minutes, and an electrical resistance of $6.0 \times 10^9$ $\Omega/cm^2$.

As is appreciated from the values of the gloss and the surface roughness Ra, it was recognized that the magnetic tapes of this Example using the non-magnetic black particles had an excellent dispersibility.

Examples 7 to 12

Magnetite particles were produced in the same manner as in Example 1. Next, using the obtained magnetite particles (starting materials), black particles precursors composed primarily of Fe and having a hematite structure was produced.

Various properties of these starting materials are shown in Table 1, and production conditions and various properties of the precursors are shown in Table 2.

TABLE 1

| | Magnetite particles coated with hydroxide of Mn | | | |
|---|---|---|---|---|
| Starting material | Kind | Average particle size ($\mu m$) | BET specific surface area ($m^2/g$) | Mn and Fe content (wt %) |
| Starting Material 1 | Magnetite particles | 0.17 | 15.8 | 17.7 |
| Starting Material 2 | Magnetite particles | 0.23 | 13.8 | 21.2 |
| Starting Material 3 | Magnetite particles | 0.25 | 13.6 | 21.0 |
| Starting Material 4 | Magnetite particles | 0.25 | 10.8 | 14.0 |

TABLE 2

| | | Production of black particles | | |
|---|---|---|---|---|
| | | Heat-dehydration | | |
| Examples | Kinds of starting materials | Temperature (° C.) | Armosphere | Time (min) |
| Example 7 | Starting material 1 | 900 | in air | 120 |
| Example 8 | Starting material 2 | 900 | in air | 60 |
| Example 9 | Starting material 3 | 800 | in air | 90 |
| Example 10 | Starting material 4 | 800 | in air | 60 |
| Example 11 | Starting material 4 | 900 | in air | 120 |
| Example 12 | Starting material 4 | 1,000 | in air | 60 |

| | Black particles | | | | |
|---|---|---|---|---|---|
| Examples | Average particle size ($\mu$m) | Geometrical standard deviation | BET specific surface area ($m^2/g$) | Mn content (wt %) | Content of soluble Na salt (ppm) |
| Example 7 | 0.22 | 1.35 | 7.2 | 17.2 | 745 |
| Example 8 | 0.30 | 1.38 | 4.6 | 20.6 | 643 |
| Example 9 | 0.40 | 1.41 | 2.8 | 20.3 | 512 |
| Example 10 | 0.30 | 1.36 | 11.0 | 13.2 | 689 |
| Example 11 | 0.33 | 1.38 | 3.1 | 13.2 | 712 |
| Example 12 | 0.36 | 1.40 | 1.9 | 13.1 | 787 |

| | Black particles | | | | | |
|---|---|---|---|---|---|---|
| | Content of soluble sulfate salt | pH of | Hue | | | Heat resistance |
| Examples | (ppm) | particles | L* | a* | b* | $\Delta$E |
| Example 7 | 832 | 7.8 | 22.43 | 0.81 | −1.24 | 0.07 |
| Example 8 | 916 | 7.6 | 22.33 | 0.53 | −1.30 | 0.10 |
| Example 9 | 690 | 7.0 | 21.76 | 0.11 | −1.72 | 0.21 |
| Example 10 | 780 | 8.1 | 22.58 | 0.43 | −1.41 | 0.15 |
| Example 11 | 1,180 | 6.8 | 22.10 | 0.22 | −1.44 | 0.05 |
| Example 12 | 1,347 | 5.8 | 22.03 | 0.18 | −1.58 | 0.05 |

Black pigments treated by the aqueous alkali solution were produced in the same manner as in Example 1 except that kinds of non-magnetic black particles composed primarily of Fe and having a hematite structure, application or non-application of the wet pulverization process, and the pH value, the temperature and the time used for the heat treatment in the aqueous alkali solution were changed variously.

The production conditions used in these Examples and properties of the obtained black pigments are shown in Table 3.

TABLE 3

| | Wet pulverization process | | Heat treatment in aqueous alkali solution | | |
|---|---|---|---|---|---|
| Examples | Use or non-use | Residue on sieve (wt %) | pH | Temperature (° C.) | Time (min) |
| Example 7 | Used | 0 | 13.2 | 91 | 180 |
| Example 8 | Used | 0 | 13.1 | 93 | 180 |
| Example 9 | Used | 0 | 13.3 | 90 | 180 |
| Example 10 | Used | 0 | 13.5 | 95 | 210 |
| Example 11 | Used | 0 | 13.3 | 90 | 180 |
| Example 12 | Used | 0 | 13.2 | 91 | 120 |

| | Black particles after alkali treatment | | | | |
|---|---|---|---|---|---|
| Examples | Average particle size ($\mu$m) | Geometrical standard deviation | BET specific surface area ($m^2/g$) | Mn content (wt %) | Content of soluble Na salt (ppm) |
| Example 7 | 0.22 | 1.35 | 7.0 | 17.3 | 133 |
| Example 8 | 0.30 | 1.37 | 4.6 | 20.6 | 136 |

TABLE 3-continued

| Example 9 | 0.40 | 1.40 | 2.8 | 20.3 | 112 |
| Example 10 | 0.29 | 1.36 | 10.8 | 13.3 | 82 |
| Example 11 | 0.33 | 1.37 | 2.9 | 13.3 | 84 |
| Example 12 | 0.36 | 1.39 | 1.9 | 13.3 | 141 |

| | Black particles after alkali treatment | | | | | |
|---|---|---|---|---|---|---|
| | Content of soluble sulfate salt | pH of | Hue | | | Heat resistance |
| Examples | (ppm) | particles | $L^*$ | $a^*$ | $b^*$ | $\Delta E$ |
| Example 7 | 50 | 8.6 | 22.26 | 0.68 | −1.33 | 0.05 |
| Example 8 | 29 | 9.2 | 22.31 | 0.60 | −1.40 | 0.12 |
| Example 9 | 125 | 9.3 | 21.49 | 0.04 | −1.79 | 0.18 |
| Example 10 | 59 | 8.9 | 22.63 | 0.32 | −1.41 | 0.10 |
| Example 11 | 81 | 9.1 | 22.13 | 0.24 | −1.53 | 0.06 |
| Example 12 | 52 | 9.0 | 21.85 | 0.30 | −1.71 | 0.04 |

Examples 13 to 18

Using the black particles prepared in Examples 7 to 12, black pigments comprising coated non-magnetic black particles were produced in the same manner as in Example 2 except that kinds and amounts of surface-coating materials were changed variously.

The production conditions used in these Examples and properties of the obtained black pigments are shown in Table 4.

TABLE 4

| | | Surface treatment | | | |
|---|---|---|---|---|---|
| | Kinds of | | Amount added, | Deposited substance | |
| Examples | black particles | Kind | calculated as element (wt %) | Kind | Amount (wt %) |
| Example 13 | Same as Example 7 | Sodium aluminate | 3.0 | Al | 2.90 |
| Example 14 | Same as Example 8 | Water glass No. 3 | 1.0 | $SiO_2$ | 0.95 |
| Example 15 | Same as Example 9 | Aluminum acetate | 2.0 | Al | 1.92 |
| Example 16 | Same as Example 10 | Colloidal silica | 3.0 | $SiO_2$ | 2.80 |
| Example 17 | Same as Example 11 | Aluminum acetate | 5.0 | Al | 4.73 |
| | | Water glass No. 3 | 1.0 | $SiO_2$ | 0.96 |
| Example 18 | Same as Example 12 | Sodium aluminate | 1.0 | Al | 0.98 |
| | | Colloidal silica | 3.0 | $SiO_2$ | 2.81 |

| | Black particles after surface treatment | | | | |
|---|---|---|---|---|---|
| Examples | Average particle size (μm) | Geometrical standard deviation | BET specific surface area (m²/g) | Mn content (wt %) | Content of soluble Na salt (ppm) |
| Example 13 | 0.22 | 1.35 | 15.2 | 16.8 | 56 |
| Example 14 | 0.30 | 1.37 | 5.1 | 20.4 | 83 |
| Example 15 | 0.41 | 1.39 | 11.0 | 20.2 | 36 |
| Example 16 | 0.29 | 1.36 | 17.2 | 12.9 | 41 |
| Example 17 | 0.32 | 1.37 | 18.0 | 12.4 | 96 |
| Example 18 | 0.36 | 1.39 | 8.3 | 12.7 | 102 |

| | Black particles after alkali treatment | | | | | |
|---|---|---|---|---|---|---|
| | Content of soluble sulfate salt | pH of | Hue | | | Heat resistance |
| Examples | (ppm) | particles | $L^*$ | $a^*$ | $b^*$ | $\Delta E$ |
| Example 13 | 29 | 8.6 | 22.42 | 0.89 | −1.34 | 0.05 |
| Example 14 | 21 | 9.1 | 22.39 | 0.63 | −1.35 | 0.09 |

TABLE 4-continued

| | | | | | | |
|---|---|---|---|---|---|---|
| Example 15 | 32 | 9.2 | 21.62 | 0.14 | −1.71 | 0.12 |
| Example 16 | 40 | 8.8 | 22.64 | 0.54 | −1.30 | 0.10 |
| Example 17 | 6 | 9.0 | 22.33 | 0.22 | −1.33 | 0.05 |
| Example 18 | 12 | 9.3 | 22.04 | 0.21 | −1.58 | 0.05 |

Comparative Examples 1 to 10, and Comparative Examples 41 and 42

Black pigments of Comparative Examples 1 to 3 which were composed of black particles composed primarily of Fe and having a hematite structure before subjected to the alkali treatment, black pigments of Comparative Examples 4 to 7 which were composed of conventional black particles, and black pigments of Comparative Examples 8 to 10 which were composed of black particles composed primarily of Fe and having a hematite structure after subjected to the alkali treatment, were prepared respectively.

Various properties of the black particles used in these Comparative Examples are shown in Tables 5 and 6.

Incidentally, the black pigment of Comparative Example 7 in which Mn was incorporated in the form of a solid solution, were produced according to the method disclosed in the afore-mentioned Japanese Patent Application Laid-open (KOKAI) 8-143316(1996).

TABLE 5

| | Production of black particles | | | | |
|---|---|---|---|---|---|
| | | Kinds of | Heat-dehydration | | |
| Comparative Examples | Kinds of black particles | starting materials | Temperature (° C.) | Atmosphere | Time (min) |
| Comparative Example 1 | Mn-containing particles having hematite structure | Starting material 2 | 900 | in air | 120 |
| Comparative Example 2 | Mn-containing particles having hematite structure | Starting material 2 | 450 | in air | 60 |
| Comparative Example 3 | Mn-containing particles having hematite structure | Starting material 2 | 800 | in air | 5 |
| Comparative Example 4 | Magnetite particles | — | — | — | — |
| Comparative Example 5 | Carbon black particles | — | — | — | — |
| Comparative Example 6 | Graphite fluoride particles | — | — | — | — |
| Comparative Example 7 | Iron oxide including solid solution with Mn | — | — | — | — |

| | Black particles after surface treatment | | | | |
|---|---|---|---|---|---|
| Comparative Examples | Average particle size (μm) | Geomertical standard deviation | BET specific surface area (m²/g) | Mn content (wt %) | Content of soluble Na salt (ppm) |
| Comparative Example 1 | 0.31 | 1.39 | 4.3 | 20.6 | 751 |
| Comparative Example 2 | 0.26 | 1.37 | 10.6 | 20.9 | 484 |
| Comparative Example 3 | 0.28 | 1.39 | 5.8 | 20.7 | 611 |
| Comparative Example 4 | 0.30 | 1.41 | 5.0 | — | 238 |
| Comparative Example 5 | 0.922 | 1.36 | 134.1 | — | 365 |
| Comparative Example 6 | 0.30 | 1.44 | 2.6 | — | 123 |
| Comparative Example 7 | 0.03 | 1.31 | 25.6 | 16.9 | 512 |

TABLE 5-continued

| | Black particles after alkali treatment | | | | | |
|---|---|---|---|---|---|---|
| | Content of soluble sulfate salt | pH of | Hue | | | Heat resistance |
| Examples | (ppm) | particles | L* | a* | b* | ΔE |
| Comparative Example 1 | 1,012 | 7.2 | 22.53 | 0.31 | −1.73 | 1.10 |
| Comparative Example 2 | 865 | 7.8 | 24.53 | 2.92 | 0.79 | 4.83 |
| Comparative Example 3 | 889 | 7.6 | 23.21 | 1.30 | −1.58 | 2.87 |
| Comparative Example 4 | 351 | 7.9 | 22.58 | 0.32 | −1.82 | 21.36 |
| Comparative Example 5 | 1,426 | 3.6 | 19.81 | −0.31 | −2.51 | 8.65 |
| Comparative Example 6 | 386 | 4.6 | 20.04 | 0.14 | −2.13 | 16.52 |
| Comparative Example 7 | 228 | 5.2 | 25.51 | 5.03 | 2.56 | 6.95 |

TABLE 6

| | | Wet pulverization process | | Heat treatment in aqueous alkali solution | | |
|---|---|---|---|---|---|---|
| Comparative Examples | Kinds of black particles | Use or non-use | Residue in sieve (wt %) | pH | Temperature (° C.) | Time (min) |
| Comparative Example 8 | Same as Comparative Example 1 | Used | 0 | 9.5 | 90 | 120 |
| Comparative Example 9 | Same as Comparative Example 1 | Used | 0 | 13.1 | 35 | 120 |
| Comparative Example 10 | Same as Comparative Example 1 | Not used | 31.5 | 13.0 | 90 | 60 |

| | Black particles after surface treatment | | | | |
|---|---|---|---|---|---|
| Comparative Examples | Average particle size (μm) | Geometrical standard deviation | BET specific surface area (m²/g) | Mn content (wt %) | Content of soluble Na salt (ppm) |
| Comparative Example 8 | 0.31 | 1.38 | 4.4 | 20.6 | 632 |
| Comparative Example 9 | 0.31 | 1.38 | 4.3 | 20.5 | 521 |
| Comparative Example 10 | 0.31 | 1.39 | 4.6 | 20.6 | 486 |

| | Black particles after alkali treatment | | | | | |
|---|---|---|---|---|---|---|
| | Content of soluble sulfate salt | pH of | Hue | | | Heat resistance |
| Examples | (ppm) | particles | L* | a* | b* | ΔE |
| Comparative Example 8 | 365 | 7.5 | 22.32 | 0.31 | −1.84 | 0.09 |
| Comparative Example 9 | 216 | 7.9 | 22.28 | 0.32 | −1.50 | 0.12 |
| Comparative Example 10 | 256 | 7.7 | 22.90 | 0.24 | −1.53 | 0.10 |

Examples 19 to 30 and Comparative Examples 11 to 20

<Production of Paint>

The paints were produced in the same manner as in Example 3 except that kinds of black pigments used were changed variously. The thus-produced paints were used to form coating films.

The production conditions used in these Examples and Comparative Examples and properties of the obtained coating films are shown in Tables 7 and 8.

TABLE 7

|  | Production of coating material | | Properties of coating material |
|---|---|---|---|
| Examples | Kinds of black particles | Kinds of resins | Viscosity (cP) |
| Example 19 | Same as Example 7 | Amino-alkyd resin | 1,100 |
| Example 20 | Same as Example 8 | Amino-alkyd resin | 896 |
| Example 21 | Same as Example 9 | Amino-alkyd resin | 845 |
| Example 22 | Same as Example 10 | Amino-alkyd resin | 972 |
| Example 23 | Same as Example 11 | Amino-alkyd resin | 896 |
| Example 24 | Same as Example 12 | Amino-alkyd resin | 640 |
| Example 25 | Same as Example 13 | Amino-alkyd resin | 998 |
| Example 26 | Same as Example 14 | Amino-alkyd resin | 793 |
| Example 27 | Same as Example 15 | Amino-alkyd resin | 712 |
| Example 28 | Same as Example 16 | Amino-alkyd resin | 742 |
| Example 29 | Same as Example 17 | Amino-alkyd resin | 666 |
| Example 30 | Same as Example 18 | Amino-alkyd resin | 538 |

| | Properties of coating film | | | | | |
|---|---|---|---|---|---|---|
| | Gloss | Hue | | | Acid resistance | |
| Examples | (%) | L* | a* | b* | ΔG (%) | ΔL |
| Example 19 | 102 | 22.12 | 0.51 | −1.38 | 5.7 | 0.54 |
| Example 20 | 101 | 22.56 | 0.12 | −1.51 | 4.8 | 0.32 |
| Example 21 | 88 | 22.69 | 0.04 | −1.78 | 2.2 | 0.44 |
| Example 22 | 95 | 22.83 | 0.84 | −1.41 | 1.6 | 0.21 |
| Example 23 | 88 | 22.65 | 0.40 | −1.53 | 1.3 | 0.33 |
| Example 24 | 86 | 22.02 | 0.21 | −1.66 | 0.9 | 0.21 |
| Example 25 | 108 | 22.08 | 0.53 | −1.32 | 3.8 | 0.32 |
| Example 26 | 104 | 22.51 | 0.10 | −1.53 | 2.6 | 0.28 |
| Example 27 | 93 | 22.63 | 0.76 | −1.75 | 2.1 | 0.05 |
| Example 28 | 101 | 22.76 | 0.68 | −1.41 | 0.8 | 0.42 |
| Example 29 | 96 | 22.58 | 0.32 | −1.61 | 1.2 | 0.10 |
| Example 30 | 90 | 21.89 | 0.19 | −1.73 | 0.6 | 0.06 |

TABLE 8

| | Production of coating material | | Properties of coating material |
|---|---|---|---|
| Comparative Examples | Kinds of black particles | Kinds of resins | Viscosity (cP) |
| Comparative Example 11 | Same as Comparative Example 1 | Amino-alkyd resin | 845 |
| Comparative Example 12 | Same as Comparative Example 2 | Amino-alkyd resin | 1,280 |
| Comparative Example 13 | Same as Comparative Example 3 | Amino-alkyd resin | 972 |
| Comparative Example 14 | Same as Comparative Example 4 | Amino-alkyd resin | 1,382 |
| Comparative Example 15 | Same as Comparative Example 5 | Amino-alkyd resin | 512 |
| Comparative Example 16 | Same as Comparative Example 6 | Amino-alkyd resin | 998 |
| Comparative Example 17 | Same as Comparative Example 7 | Amino-alkyd resin | 2,560 |
| Comparative Example 18 | Same as Comparative Example 8 | Amino-alkyd resin | 712 |
| Comparative Example 19 | Same as Comparative Example 9 | Amino-alkyd resin | 640 |
| Comparative Example 20 | Same as Comparative Example 10 | Amino-alkyd resin | 742 |

| | Properties of coating film | | | | | |
|---|---|---|---|---|---|---|
| | Gloss | Hue | | | Acid resistance | |
| Comparative Examples | (%) | L* | a* | b* | ΔG (%) | ΔL |
| Comparative Example 11 | 78 | 22.61 | 0.13 | −1.53 | 10.8 | 11.46 |
| Comparative Example 12 | 58 | 24.13 | 2.65 | 1.03 | 11.1 | 1.65 |
| Comparative Example 13 | 76 | 22.90 | 1.14 | −1.36 | 10.1 | 1.56 |
| Comparative Example 14 | 84 | 22.41 | 0.16 | −1.74 | 15.1 | 2.21 |
| Comparative Example 15 | 103 | 19.94 | −0.30 | −2.31 | 13.8 | 1.87 |
| Comparative Example 16 | 71 | 20.13 | −0.03 | −2.01 | 21.8 | 3.64 |
| Comparative Example 17 | 63 | 26.40 | 5.10 | 2.80 | 21.6 | 3.56 |
| Comparative Example 18 | 84 | 2Z.51 | 0.08 | −1.56 | 10.1 | 1.41 |
| Comparative Example 19 | 81 | 22.48 | 0.10 | −1.59 | 9.2 | 1.32 |
| Comparative Example 20 | 83 | 22.91 | 0.21 | −1.54 | 8.6 | 1.22 |

Examples 31 to 42 and Comparative Examples 21 to 30

<Production of Resin Composition>

The resin compositions were produced in the same manner as in Example 4 except that kinds of black pigments used were changed variously.

The production conditions used in these Examples and Comparative Examples and properties of the obtained resin compositions are shown in Tables 9 and 10.

TABLE 9

| | Production of resin composition | | | |
|---|---|---|---|---|
| | Black Particles | | Resin | |
| Examples | Kind | Amount (part by weight) | Kind | Amount (part by weight) |
| Example 31 | Same as Example 7 | 3.0 | Polyvinyl chloride resin 103EP8D (produced by Nippon Zeon Co., Ltd.) | 97.0 |
| Example 32 | Same as Example 8 | 3.0 | Polyvinyl chloride resin 103EP8D (produced by Nippon Zeon Co., Ltd.) | 97.0 |
| Example 33 | Same as Example 9 | 3.0 | Polyvinyl chloride resin 103EP8D (produced by Nippon Zeon Co., Ltd.) | 97.0 |
| Example 34 | Same as Example 10 | 3.0 | Polyvinyl chloride resin 103EP8D (produced by Nippon Zeon Co., Ltd.) | 95.0 |
| Example 35 | Same as Example 11 | 3.0 | Polyvinyl chloride resin 103EP8D (produced by Nippon Zeon Co., Ltd.) | 95.0 |
| Example 36 | Same as Example 12 | 3.0 | Polyvinyl chloride resin 103EP8D (produced by Nippon Zeon Co., Ltd.) | 98.0 |
| Example 37 | Same as Example 13 | 3.0 | Polyvinyl chloride resin 103EP8D (produced by Nippon Zeon Co., Ltd.) | 97.0 |
| Example 38 | Same as Example 14 | 3.0 | Polyvinyl chloride resin 103EP8D (produced by Nippon Zeon Co., Ltd.) | 97.0 |
| Example 39 | Same as Example 15 | 3.0 | Polyvinyl chloride resin 103EP8D (produced by Nippon Zeon Co., Ltd.) | 97.0 |
| Example 40 | Same as Example 16 | 3.0 | Polyvinyl chloride resin 103EP8D (produced by Nippon Zeon Co., Ltd.) | 97.0 |
| Example 41 | Same as Example 17 | 3.0 | Polyvinyl chloride resin 103EP8D (produced by Nippon Zeon Co., Ltd.) | 97.0 |
| Example 42 | Same as Example 18 | 3.0 | Polyvinyl chloride resin 103EP8D (produced by Nippon Zeon Co., Ltd.) | 97.0 |

| | Production of resin composition | | |
|---|---|---|---|
| | Additives | | |
| Examples | Kind | Amount (part by weight) | Mixing temperature (° C.) |
| Example 31 | Calcium stearate | 1.0 | 160 |
| Example 32 | Calcium stearate | 1.0 | 160 |
| Example 33 | Calcium stearate | 1.0 | 160 |
| Example 34 | Calcium stearate | 1.0 | 160 |
| Example 35 | Calcium stearate | 1.0 | 160 |
| Example 36 | Calcium stearate | 1.0 | 160 |
| Example 37 | Calcium stearate | 1.0 | 160 |
| Example 38 | Calcium stearate | 1.0 | 160 |
| Example 39 | Calcium stearate | 1.0 | 160 |
| Example 40 | Calcium stearate | 1.0 | 160 |
| Example 41 | Calcium stearate | 1.0 | 160 |
| Example 42 | Calcium stearate | 1.0 | 160 |

| | Resin composition | | | | | |
|---|---|---|---|---|---|---|
| | Dispersing | Hue | | | Ratio of area deteriorated and discolored upon heating at 190° C. $(S/S_0) \times 100$ (%) | | |
| Examples | state | $L^*$ | $a^*$ | $b^*$ | 30 min | 60 min | 90 min |
| Example 31 | 5 | 23.18 | 0.68 | −132 | 0 | 0 | 5 |
| Example 32 | 5 | 23.61 | 0.23 | −1.53 | 0 | 0 | 5 |
| Example 33 | 4 | 23.11 | 0.13 | −1.83 | 0 | 5 | 5 |
| Example 34 | 5 | 23.40 | 0.89 | −1.34 | 0 | 0 | 5 |
| Example 35 | 4 | 23.46 | 0.50 | −1.61 | 0 | 5 | 10 |
| Example 36 | 4 | 22.21 | 0.21 | −1.91 | 0 | 5 | 5 |
| Example 37 | 5 | 22.29 | 0.78 | −1.33 | 0 | 0 | 0 |

TABLE 9-continued

| | | | | | | | |
|---|---|---|---|---|---|---|---|
| Example 38 | 5 | 22.94 | 0.21 | −1.21 | 0 | 0 | 5 |
| Example 39 | 5 | 23.12 | 0.89 | −1.84 | 0 | 0 | 0 |
| Example 40 | 5 | 23.30 | 0.90 | −1.60 | 0 | 0 | 5 |
| Example 41 | 5 | 23.11 | 0.43 | −1.83 | 0 | 0 | 0 |
| Example 42 | 5 | 22.26 | 0.23 | −1.62 | 0 | 0 | 0 |

TABLE 10

| | Production of resin composition | | | |
|---|---|---|---|---|
| | Black Particles | | Resin | |
| Comparative Examples | Kind | Amount (part by weight) | Kind | Amount (part by weight) |
| Comparative Example 21 | Same as Comparative Example 1 | 3.0 | Polyvinyl chloride resin 103EP8D (produced by Nippon Zeon Co., Ltd.) | 97.0 |
| Comparative Example 22 | Same as Comparative Example 2 | 3.0 | Polyvinyl chloride resin 103EP8D (produced by Nippon Zeon Co., Ltd.) | 97.0 |
| Comparative Example 23 | Same as Comparative Example 3 | 3.0 | Polyvinylchloride resin 103EP8D (produced by Nippon Zeon Co., Ltd.) | 97.0 |
| Comparative Example 24 | Same as Comparative Example 4 | 3.0 | Polyvinyl chloride resin 103EP8D (produced by Nippon Zeon Co., Ltd.) | 97.0 |
| Comparative Example 25 | Same as Comparative Example 5 | 3.0 | Polyvinyl chloride resin 103EP8D (produced by Nippon Zeon Co., Ltd.) | 97.0 |
| Comparative Example 26 | Same as Comparative Example 6 | 3.0 | Polyvinyl chloride resin 103EP8D (produced by Nippon Zeon Co., Ltd.) | 97.0 |
| Comparative Example 27 | Same as Comparative Example 7 | 3.0 | Polyvinyl chloride resin 103EP8D (produced by Nippon Zeon Co., Ltd.) | 97.0 |
| Comparative Example 28 | Same as Comparative Example 8 | 3.0 | Polyvinyl chloride resin 103EP8D (produced by Nippon Zeon Co., Ltd.) | 97.0 |
| Comparative Example 29 | Same as Comparative Example 9 | 3.0 | Polyvinyl chloride resin 103EP8D (produced by Nippon Zeon Co., Ltd.) | 97.0 |
| Comparative Example 30 | Same as Comparative Example 10 | 3.0 | Polyvinyl chloride resin 103EP8D (produced by Nippon Zeon Co.,Ltd.) | 97.0 |

| | Production of resin composition | | |
|---|---|---|---|
| | Additives | | |
| Comparative Examples | Kind | Amount (part by weight) | Mixing temperature (° C.) |
| Comparative Example 21 | Calcium stearate | 1.0 | 160 |
| Comparative Example 22 | Calcium stearate | 1.0 | 160 |
| Comparative Example 23 | Calcium stearate | 1.0 | 160 |
| Comparative Example 24 | Calcium stearate | 1.0 | 160 |
| Comparative Example 25 | Calcium stearate | 1.0 | 160 |
| Comparative Example 26 | Calcium stearate | 1.0 | 160 |
| Comparative Example 27 | Calcium stearate | 1.0 | 160 |
| Comparative Example28 | Calcium stearate | 1.0 | 160 |
| Comparative Example 29 | Caicium stearate | 1.0 | 160 |
| Comparative Example 30 | Caicium stearate | 1.0 | 160 |

TABLE 10-continued

| | | Resin composition | | | | | |
|---|---|---|---|---|---|---|---|
| | Dispersing | Hue | | | Ratio of area deteriorated and discolored upon heating at 190° C. $(S/S_0) \times 100$ (%) | | |
| Examples | state | L* | a* | b* | 30 min | 60 min | 90 min |
| Comparative Example 21 | 2 | 23.11 | 0.35 | −1.28 | 15 | 40 | 60 |
| Comparative Example 22 | 3 | 24.32 | 3.65 | 1.22 | 15 | 50 | 85 |
| Comparative Example 23 | 3 | 23.20 | 2.09 | −1.14 | 15 | 35 | 75 |
| Comparative Example 24 | 4 | 23.01 | 0.65 | −1.61 | 10 | 30 | 50 |
| Comparative Example 25 | 4 | 21.08 | 0.54 | −2.07 | 5 | 10 | 15 |
| Comparative Example 26 | 2 | 20.93 | 0.84 | −2.20 | 20 | 60 | 95 |
| Comparative Example 27 | 1 | 26.84 | 5.39 | 3.84 | 40 | 65 | 90 |
| Comparative Example 28 | 3 | 23.09 | 0.41 | −1.50 | 15 | 30 | 45 |
| Comparative Example 29 | 3 | 23.08 | 0.30 | −1.54 | 10 | 20 | 25 |
| Comparative Example 30 | 2 | 23.41 | 0.32 | −1.53 | 10 | 25 | 35 |

Production Examples 2 to 7 and Comparative Examples 31 to 33

<Production of Black Filler>

The black fillers comprising the black particles were produced in the same manner as in Production Example 1 except that amounts of the ferrous salts and the alkali hydroxides used, kinds and amounts of the Mn salts added, conditions for the heat treatment, use or non-use of the surface treatment or the like were changed variously.

The production conditions for the black particles are shown in Tables 11 to 13, and properties of the black particles and the other fillers used for comparative purposes are shown in Table 14.

TABLE 11

| | Production conditions of magnetite particles Aqueous ferrous salt solution | | |
|---|---|---|---|
| Examples | Kind | Concentration (mol/l) | Amount added (l) |
| Production Example 2 | FeSO$_4$ | 1.40 | 250 |
| Production Example 3 | FeSO$_4$ | 1.40 | 300 |
| Production Example 4 | — | — | — |
| Production Example 5 | FeSO$_4$ | 1.40 | 300 |
| Production Example 6 | FeSO$_4$ | 1.40 | 250 |
| Production Example 7 | FeSO$_4$ | 1.40 | 300 |

| | Production conditions of magnetite particles Aqueous alkali hydroxide solution | | | |
|---|---|---|---|---|
| Examples | Kind | Concentration (N) | Amount added (l) | 2OH/Fe |
| Production Example 2 | NaOH | 15.75 | 50 | 1.13 |
| Production Example 3 | NaOH | 15.75 | 60 | 1.13 |

TABLE 11-continued

| Production Example 4 | — | — | — | — |
|---|---|---|---|---|
| Production Example 5 | NaOH | 15.75 | 60 | 1.13 |
| Production Example 6 | NaOH | 15.75 | 50 | 1.13 |
| Production Example 7 | NaOH | 15.75 | 60 | 1.13 |

| | Production conditions of magnetite particles | | | |
|---|---|---|---|---|
| Examples | pH | Temperature (° C.) | Amount passed (l/min) | Reaction Time (Minutes) |
| Production Example 2 | 13.3 | 92 | 300 | 75 |
| Production Example 3 | 13.3 | 92 | 300 | 80 |
| Production Example 4 | — | — | — | — |
| Production Example 5 | 13.5 | 90 | 250 | 90 |
| Production Example 6 | 13.3 | 92 | 300 | 75 |
| Production Example 7 | 13.3 | 92 | 300 | 80 |

TABLE 12

| | Coating treatment of Mn compound or Mn and Fe compounds Aqueous Mn salt solution | | | |
|---|---|---|---|---|
| Examples | Kind | Concentration (mol/l) | Amount added (l) | Mn/(Fe + Mn) (atomic %) |
| Production Example 2 | MnSO$_4$ | 1.75 | 100 | 25 |
| Production Example 3 | MnSO$_4$ | 1.40 | 150 | 30 |

TABLE 12-continued

| Production Example | Kind | | | |
|---|---|---|---|---|
| Production Example 4 | MnSO$_4$ | 1.40 | 150 | 30 |
| Production Example 5 | MnSO$_4$ | 1.40 | 100 | 20 |
| Production Example 6 | MnSO$_4$ | 1.75 | 100 | 25 |
| Production Example 7 | MnSO$_4$ | 1.40 | 150 | 30 |

Production conditions of magnetite particles
Aqueous ferrous salt solution

| Production Examples | Kind | Concentration (mol/l) | Amount added (l) | Fe$^{2+}$/(Fe + Mn) (atomic %) |
|---|---|---|---|---|
| Production Example 2 | FeSO$_4$ | 1.75 | 100 | 25 |
| Production Example 3 | FeSO$_4$ | 1.40 | 50 | 10 |
| Production Example 4 | FeSO$_4$ | 1.40 | 350 | 70 |
| Production Example 5 | FeSO$_4$ | 1.40 | 100 | 20 |
| Production Example 6 | FeSO$_4$ | 1.75 | 100 | 25 |
| Production Example 7 | FeSO$_4$ | 1.40 | 50 | 10 |

Production conditions of magnetite particles
Aqueous alkali hydroxide solution

| Production Examples | Kind | Concentration (mol/l) | Amount added (l) | 2OH/(Fe + Mn) adding ratio |
|---|---|---|---|---|
| Production Example 2 | NaOH | 11.2 | 62.5 | 1.0 |
| Production Example 3 | NaOH | 11.2 | 50 | 1.0 |
| Production Example 4 | NaOH | 11.2 | 141 | 1.13 |
| Production Example 5 | NaOH | 11.2 | 50 | 1.0 |
| Production Example 6 | NaOH | 11.2 | 62.5 | 1.0 |
| Production Example 7 | NaOH | 11.2 | 50 | 1.0 |

Production conditions of magnetite particles

| Production Examples | pH | Temperature (° C.) | Amount passed (l/min) | Reaction Time (Minutes) |
|---|---|---|---|---|
| Production Example 2 | 13.5 | 90 | 700 | 128 |
| Production Example 3 | 13.5 | 90 | 700 | 160 |
| Production Example 4 | 13.3 | 85 | 700 | 240 |
| Production Example 5 | 13.5 | 90 | 700 | 180 |
| Production Example 6 | 13.5 | 90 | 700 | 128 |
| Production Example 7 | 13.5 | 90 | 700 | 160 |

TABLE 13

Production conditions of black filler
Coating particles of Mn compound and Fe compound

| Production Examples | Kind | Average particle size (μm) | BET specific surface area (m$^2$/g) | Mn content (wt %) |
|---|---|---|---|---|
| Production Example 2 | Magnetite particles | 0.17 | 15.8 | 17.7 |
| Production Example 3 | Magnefite particles | 0.23 | 13.8 | 21.2 |
| Production Example 4 | #agnetite particles | 0.25 | 13.6 | 21.0 |
| Production Example 5 | Magnetite particles | 0.25 | 10.8 | 14.0 |
| Production Example 6 | Magnetite particles | 0.17 | 15.8 | 17.7 |
| Production Example 7 | Magnetite particles | 0.23 | 13.8 | 21.2 |

Production conditions of black filler
Calcining treatment

| Production Examples | Temperature (° C.) | Atmosphere | Treating time (min) |
|---|---|---|---|
| Production Example 2 | 900 | in air | 120 |
| Production Example 3 | 900 | in air | 60 |
| Production Example 4 | 800 | in air | 90 |
| Production Example 5 | 800 | in air | 60 |
| Production Example 6 | 900 | in air | 120 |
| Production Example 7 | 900 | in air | 60 |

Production conditions of black filler
Surface treatment

| Production Examples | Kind | Amount added (wt %) | pH adjusted |
|---|---|---|---|
| Production Example 2 | — | — | — |
| Production Example 3 | — | — | — |
| Production Example 4 | — | — | — |
| Production Example 5 | Sodium aluminate | 3.0 | 7.0 |
| Production Example 6 | Water glass No. 3 | 5.0 | 7.5 |
| Production Example 7 | Sodium aluminate Water glass No. 3 | 1.0 0.5 | 6.2 |

TABLE 14

| Production Examples and Comparative Examples | Kind | Average particles size (μm) | BET specific surface area (m$^2$/g) | Mn content (wt %) |
|---|---|---|---|---|
| Production Example 2 | Hematite particles | 0.22 | 7.2 | 17.2 |
| Production Example 3 | Hematite particles | 0.30 | 4.6 | 20.6 |
| Production Example 4 | Hematite particles | 0.40 | 2.8 | 20.3 |
| Production Example 5 | Hematite particles | 0.30 | 11.0 | 13.2 |
| Production Example 6 | Hematite particles | 0.22 | 7.8 | 16.3 |

TABLE 14-continued

| Production Examples and Comparative Examples | Properties of black filler and other fillers | | | | |
|---|---|---|---|---|---|
| | | | | Results of colorimetry | |
| | Al (wt %) | SiO₂ (wt %) | L* | a* | b* |
| Production Example 2 | — | — | 22.6 | 1.7 | −0.7 |
| Production Example 3 | — | — | 21.4 | 0.3 | −1.8 |
| Production Example 4 | — | — | 21.6 | −0.1 | −1.5 |
| Production Example 5 | 2.98 | — | 21.9 | 1.3 | −1.2 |
| Production Example 6 | — | — | 4.89 | 22.8 | 2.1 | −0.9 |
| Production Example 7 | 1.00 | 0.49 | 21.3 | 0.6 | |
| Comparative Example 31 | — | — | — | — | — |
| Comparative Example 32 | — | — | 34.7 | 36.5 | 34.3 |
| Comparative Example 33 | — | — | 20.0 | 0.0 | −1.0 |

(Note: Production Examples 2-5 row from left page; Production Example 7 continued row had Hematite particles 0.30, 6.8, 20.2; Comparative Example 31 α-Al₂O₃ 0.40, 7.3, —; Comparative Example 32 α-Fe₂O₃ 0.25, 8.8, —; Comparative Example 33 Graphite fluoride 0.30, 2.6, —)

Examples 43 to 52 and Comparative Examples 34 to 40

<Production of Magnetic Recording Medium>

The magnetic recording media were produced in the same manner as in Example 5 except that kinds of the magnetic particles, amounts of the binder resins, kinds and amounts of the black fillers and the other fillers added, amounts of the solvents were changed variously. The production conditions of the magnetic recording media are shown in Table 15, and properties thereof are shown in Table 16.

TABLE 15

| | Conditions for production of magnetic recording medium Magnetic particles | | | | | |
|---|---|---|---|---|---|---|
| Examples and Comparative Examples | Kind | Average particle size (μm) | BET specific surface area (m²/g) | Coercive force Hc (Oe) | Saturation magnetization σs (emu/g) | Amount blended (part by weight) |
| Example 43 | Co-coated maghemite | 0.16 | 48.6 | 725 | 75.6 | 100 |
| Example 44 | Magnetic metal particles (Fe) | 0.15 | 55.1 | 1,632 | 128.6 | 100 |
| Example 45 | Co-coated magnetite | 0.24 | 31.3 | 683 | 82.8 | 100 |
| Example 46 | Co-coated magnetite | 0.24 | 31.3 | 683 | 82.8 | 100 |
| Example 47 | Co-coated magnetite | 0.24 | 31.3 | 683 | 82.8 | 100 |
| Example 48 | Co-coated magnetite | 0.21 | 38.9 | 712 | 80.9 | 100 |
| Example 49 | Co-coated magnetite | 0.24 | 31.3 | 683 | 82.8 | 100 |
| Example 50 | Co-coated magnetite | 0.24 | 31.3 | 683 | 82.8 | 100 |
| Example 51 | Co-coated magnehtite | 0.24 | 31.3 | 683 | 82.8 | 100 |
| Example 52 | Co-coated magnetite | 0.24 | 31.3 | 683 | 82.8 | 100 |
| Comparative Example 34 | Co-coated magnetite | 0.24 | 31.3 | 683 | 82.8 | 100 |
| Comparative Example 35 | Co-coated magnetite | 0.24 | 31.3 | 683 | 82.8 | 100 |
| Comparative Example 36 | Co-coated magnetite | 0.24 | 31.3 | 683 | 82.8 | 100 |
| Comparative Example 37 | Co-coated magnetite | 0.24 | 31.3 | 683 | 82.8 | 100 |
| Comparative Example 38 | Co-coated magnetite | 0.24 | 31.3 | 683 | 82.8 | 100 |
| Comparative Example 39 | Co-coated magnetite | 0.24 | 31.3 | 683 | 82.8 | 100 |
| Comparative Example 40 | Co-coated magnetite | 0.24 | 31.3 | 683 | 82.8 | 100 |

TABLE 15-continued

| Examples and Comparative Examples | Conditions for production of magnetic recording medium | | | | |
|---|---|---|---|---|---|
| | Black filler (filling material) | | Carbon black | Other additives | |
| | Kind | Amount blended (wt part) | Amount blended (wt part) | Kind | Amount blended (wt part) |
| Example 43 | Black filler used in Production Example 2 | 7 | 3.0 | Myristic acid Butyl stearate | 1.0 2.0 |
| Example 44 | Black filler used in Production Example 3 | 7 | 0 | Myristic acid Stearic acid Butyl stearate | 1.0 1.0 2.0 |
| Example 45 | Black filler used in Production Example 4 | 7 | 1.0 | Myristic acid Butyl stearate | 1.0 2.0 |
| Example 46 | Black filler used in Production Example 5 | 7 | 1.0 | Myristic acid Butyl stearate | 1.0 2.0 |
| Example 47 | Black filler used in Production Example 6 | 7 | 1.0 | Myristic acid Butyl stearate | 1.0 2.0 |
| Example 48 | Black filler used in Production Example 7 | 7 | 1.0 | Myristic acid Butyl stearate | 1.0 2.0 |
| Example 49 | Black filler used in Production Example 1 | 14 | 0.5 | Mytistic acid Butyl stearate | 1.0 2.0 |
| Example 50 | Black filler used in Production Example 1 | 21 | 0.1 | Myristic acid Butyl stearate | 1.0 2.0 |
| Example 51 | Black filler used in Production Example 7 | 14 | 0.5 | Myristic acid Butyl stearate | 1.0 2.0 |
| Example 52 | Black filler used in Production Example 7 | 21 | 0.1 | Myristic acid Butyl stearate | 1.0 2.0 |
| Comparative Example 34 | α-Al$_2$O$_3$ used in Comparative Example 31 | 7 | 1.0 | Myristic acid Butyl stearate | 1.0 2.0 |
| Comparative Example 35 | α-Al$_2$O$_3$ used in Comparative Example 31 | 14 | 1.0 | Myristic acid Butyl stearate | 1.0 2.0 |
| Comparative Example 36 | α-Al$_2$O$_3$ used in Comparative Example 31 | 21 | 1.0 | Myristic acid Butyl stearate | 1.0 2.0 |
| Comparative Example 37 | α-Fe$_2$O$_3$ used in Comparative Example 32 | 7 | 1.0 | Myristic acid Butyl stearate | 1.0 2.0 |
| Comparative Example 38 | α-Fe$_2$O$_3$ used in Comparative Example 32 | 14 | 1.0 | Myristic acid Butyl stearate | 1.0 2.0 |
| Comparative Example 39 | Graphite fluoride used in Comparative Example 33 | 7 | 1.0 | Myristic acid Butyl stearate | 1.0 2.0 |
| Comparative Example 40 | Graphite fluoride used in Comparative Example 33 | 14 | 0.5 | Myristic acid Butyl stearate | 1.0 2.0 |

| Examples and Comparative Examples | Conditions for production of magnetic recording medium Binder resin | | | |
|---|---|---|---|---|
| | Kind | Amount blended (wt part) | Kind | Amount blended (wt part) |
| Example 43 | Vinyl chloride-based resin MR-110 | 10.0 | Polyurethane resin TI-1075 | 10.0 |
| Example 44 | Vinyl chloride-based resin MR-110 | 12.5 | Polyurethane resin TI-1075 | 7.5 |
| Example 45 | Vinyl chloride-based resin MR-110 | 10.0 | Polyurethane resin TI-1075 | 10.0 |
| Example 46 | Vinyl chloride-based resin MR-110 | 10.0 | Polyurethane resin TI-1075 | 10.0 |
| Example 47 | Vinyl chloride-based resin MR-110 | 10.0 | Polyurethane resin TI-1075 | 10.0 |
| Example 48 | Vinyl chloride-based resin MR-110 | 10.0 | Polyurethane resin TI-1075 | 10.0 |
| Example 49 | Vinyl chloride-based resin MR-110 | 10.0 | Polyurethane resin TI-1075 | 10.0 |
| Example 50 | Vinyl chloride-based resin MR-110 | 10.0 | Polyurethane resin TI-1075 | 10.0 |
| Example 51 | Vinyl chloride-based resin MR-110 | 10.0 | Polyurethane resin TI-1075 | 10.0 |
| Example 52 | Vinyl chloride-based resin MR-110 | 10.0 | Polyurethane resin TI-1075 | 10.0 |
| Comparative Example 34 | Vinyl chloride-based resin MR-110 | 10.0 | Polyurethane resin TI-1075 | 10.0 |
| Comparative Example 35 | Vinyl chloride-based resin MR-110 | 10.0 | Polyurethane resin TI-1075 | 10.0 |
| Comparative Example 36 | Vinyl chloride-based resin MR-110 | 10.0 | Polyurethane resin TI-1075 | 10.0 |

TABLE 15-continued

| | | | | |
|---|---|---|---|---|
| Comparative Example 37 | Vinyl chloride-based resin MR-110 | 10.0 | Polyurethane resin TI-1075 | 10.0 |
| Comparative Example 38 | Vinyl chloride-based resin MR-110 | 10.0 | Polyurethane resin TI-1075 | 10.0 |
| Comparative Example 39 | Vinyl chloride-based resin MR-110 | 10.0 | Polyurethane resin TI-1075 | 10.0 |
| Comparative Example 40 | Vinyl chloride-based resin MR-110 | 10.0 | Polyurethane resin TI-1075 | 10.0 |

| Example and Comparative Examples | Conditions for production of magnetic recording medium Binder resin | | Properties of magnetic coating material Viscosity (cP) |
|---|---|---|---|
| | Kind | Amount blended (part by weight) | |
| Example 43 | Polyisocyanate E-31 | 5.0 | 3210 |
| Example 44 | Polyisocyanate E-31 | 5.0 | 7880 |
| Example 45 | Polyisocyanate E-31 | 5.0 | 2570 |
| Example 46 | Polyisocyanate E-31 | 5.0 | 2680 |
| Example 47 | Polyisocyanate E-31 | 5.0 | 2770 |
| Example 48 | Polyisocyanate E-31 | 5.0 | 3130 |
| Example 49 | Polyisocyanate E-31 | 5.0 | 2880 |
| Example 50 | Polyisocyanate E-31 | 5.0 | 2760 |
| Example 51 | Polyisocyanate E-31 | 5.0 | 2660 |
| Example 52 | Polyisocyanate E-31 | 5.0 | 2380 |
| Comparative Example 34 | Polyisocyanate E-31 | 5.0 | 3100 |
| Comparative Example 35 | Polyisocyanate E-31 | 5.0 | 3210 |
| Comparative Example 36 | Polyisocyanate E-31 | 5.0 | 4810 |
| Comparative Example 37 | Polyisocyanate E-31 | 5.0 | 2850 |
| Comparative Example 38 | Polyisocyanate E-31 | 5.0 | 2650 |
| Comparative Example 39 | Polyisocyanate E-31 | 5.0 | 4160 |
| Comparative Example 40 | Polyisocyanate E-31 | 5.0 | 5870 |

TABLE 16

| Examples and Comparative Examples | Properties of magnetic recording medium | | | | | |
|---|---|---|---|---|---|---|
| | Coercive force Hc (Oe) | Residual magnetic flux density Br (Gauss) | Squareness Br/Bm | Degree of orientation OR | Gloss (%) | Linear coefficient ($\mu m^{-1}$) |
| Example 43 | 765 | 1,422 | 0.84 | 2.55 | 183 | 1.25 |
| Example 44 | 1,730 | 2,706 | 0.82 | 2.43 | 228 | 1.26 |
| Example 45 | 732 | 1,465 | 0.84 | 2.58 | 170 | 1.21 |
| Example 46 | 728 | 1,562 | 0.85 | 2.61 | 178 | 1.21 |
| Example 47 | 735 | 1,524 | 0.85 | 2.71 | 179 | 1.25 |
| Example 48 | 758 | 1,516 | 0.86 | 2.69 | 181 | 1.24 |
| Example 49 | 728 | 1,381 | 0.82 | 2.56 | 172 | 1.31 |
| Example 50 | 726 | 1,310 | 0.82 | 2.55 | 165 | 1.38 |
| Example 51 | 731 | 1,403 | 0.84 | 2.60 | 176 | 1.33 |
| Example 52 | 728 | 1,331 | 0.83 | 2.60 | 170 | 1.40 |
| Comparative Example 34 | 726 | 1,365 | 0.80 | 2.46 | 165 | 1.15 |
| Comparative Example 35 | 731 | 1,216 | 0.80 | 2.42 | 161 | 1.01 |
| Comparative Example 36 | 725 | 1,183 | 0.78 | 2.36 | 158 | 0.88 |
| Comparative Example 37 | 729 | 1,465 | 0.82 | 2.49 | 172 | 1.18 |
| Comparative Example 38 | 731 | 1,362 | 0.80 | 2.38 | 166 | 1.10 |
| Comparative Example 39 | 730 | 1,321 | 0.76 | 2.41 | 152 | 1.31 |
| Comparative Example 40 | 725 | 1,210 | 0.73 | 2.28 | 143 | 1.42 |

TABLE 16-continued

| Examples and Comparative Examples | Properties of magnetic recording medium | | | | |
|---|---|---|---|---|---|
| | Signal recording property | | Durability | Electrical resistance | Surface roughness |
| | 1 MHz (dB) | 4 NHz (dB) | (min) | ($\Omega/cm^2$) | Ra (nm) |
| Example 43 | +0.71 | +2.2 | 25.6 | $9.0 \times 10^9$ | 6.1 |
| Example 44 | +1.81 | +5.3 | 21.6 | $2.0 \times 10^8$ | 6.5 |
| Example 45 | +2.0 | +1.3 | 23.1 | $2.5 \times 10^9$ | 7.2 |
| Example 46 | +1.7 | +1.7 | 22.8 | $3.8 \times 10^9$ | 6.8 |
| Example 47 | +1.8 | +2.7 | 28.6 | $5.4 \times 10^9$ | 6.4 |
| Example 48 | +1.5 | +2.8 | ≧30 | $3.2 \times 10^9$ | 5.6 |
| Example 49 | +1.5 | +1.3 | ≧30 | $3.8 \times 10^9$ | 6.4 |
| Example 50 | +1.2 | +1.1 | ≧30 | $5.0 \times 10^9$ | 75 |
| Example 51 | +1.8 | +1.5 | ≧30 | $1.0 \times 10^9$ | 6.8 |
| Example 52 | +1.5 | +1.4 | ≧30 | $1.2 \times 10^9$ | 7.2 |
| Comparative Example 34 | 0.0 | 0.0 | 25.6 | $5.9 \times 10^9$ | 8.6 |
| Comparative Example 35 | −1.3 | −1.5 | ≧30 | $9.9 \times 10^9$ | 10.2 |
| Comparative Example 36 | −2.9 | −3.1 | ≧30 | $1.2 \times 10^{10}$ | 19.2 |
| Comparative Example 37 | +0.7 | +0.5 | 8.6 | $5.9 \times 10^9$ | 7.8 |
| Comparative Example 38 | −0.7 | −0.7 | 15.3 | $1.0 \times 10^{10}$ | 11.2 |
| Comparative Example 39 | −1.6 | −1.5 | 2.6 | $2.3 \times 10^9$ | 17.0 |
| Comparative Example 40 | −3.3 | −3.3 | 5.8 | $2.1 \times 10^9$ | 22.8 |

Examples 53 to 64 and Comparative Examples 43 to 48
<Production of Magnetic Recording Medium>

The magnetic recording media were produced in the same manner as in Example 6 except that kinds of the magnetic particles, amounts of the binder resins, kinds and amounts of the black fillers and the other fillers added, amounts of the solvents were changed variously. The production conditions of the magnetic recording media are shown in Tables 17 and 18, and properties thereof are shown in Tables 19 and 20.

TABLE 17

| | Conditions for production of magnetic recording medium Magnetic particles | | | | | |
|---|---|---|---|---|---|---|
| Examples | Kind | Average particle size (μm) | BET specific surface area (m²/g) | Coercive force Hc (Oe) | Saturation magnetization σs (emu/g) | Amount blended (part by weight) |
| Example 53 | Co-coated magnetite | 0.21 | 38.9 | 712 | 80.9 | 100.0 |
| Example 54 | Co-coated magnetite | 0.24 | 31.3 | 683 | 82.8 | 100.0 |
| Example 55 | Co-coated magnetite | 0.16 | 48.6 | 725 | 75.6 | 100.0 |
| Example 56 | Co-coated magnetite | 0.21 | 38.9 | 712 | 80.9 | 100.0 |
| Example 57 | Co-coated magnetite | 0.24 | 31.3 | 683 | 82.8 | 100.0 |
| Example 58 | Co-coated magnetite | 0.21 | 38.9 | 712 | 80.9 | 100.0 |
| Example 59 | Co-coated magnetite | 0.21 | 38.9 | 712 | 80.9 | 100.0 |
| Example 60 | Co-coated magnetite | 0.24 | 31.3 | 683 | 82.8 | 100.0 |
| Example 61 | Co-coated magnetite | 0.16 | 48.6 | 725 | 75.6 | 100.0 |
| Example 62 | Co-coated magnetite | 0.21 | 38.9 | 712 | 80.9 | 100.0 |
| Example 63 | Co-coated magnetite | 0.24 | 31.3 | 683 | 82.8 | 100.0 |
| Example 64 | Magnetic metal particles (Fe) | 0.15 | 55.1 | 1,632 | 128.6 | 100.0 |

TABLE 17-continued

| | Conditions for production of magnetic recording medium | | | | | |
|---|---|---|---|---|---|---|
| | Black filler (filling material) | | Carbon black | Other additives | | |
| Examples | Kind | blended (wt part) | blended (wt part) | Kind | blended (wt part) | |
| Example 53 | Black filler used in Example 7 | 7.0 | 1.0 | Myristic acid Butyl stearate | 1.0 2.0 | |
| Example 54 | Black filler used in Example 8 | 7.0 | 0.0 | Myristic acid Butyl stearate | 1.0 2.0 | |
| Example 55 | Black filler used in Example 9 | 7.0 | 3.0 | Myristic acid Butylstearate | 1.0 2.0 | |
| Example 56 | Black filler used in Example 10 | 21.0 | 1.0 | Myristic acid Butyl stearate | 1.0 2.0 | |
| Example 57 | Black filler used in Example 11 | 7.0 | 1.0 | Myristic acid Butylstearate | 1.0 2.0 | |
| Example 58 | Black filler used in Example 12 | 14.0 | 1.0 | Myristic acid Butyl stearate | 1.0 2.0 | |
| Example 59 | Black fifler used in Example 13 | 7.0 | 0.5 | Myristic acid Butyl stearate | 1.0 2.0 | |
| Example 60 | Black filler used in Example 14 | 7.0 | 1.0 | Myristic acid Butylstearate | 1.0 2.0 | |
| Example 61 | Black filler used in Example 15 | 7.0 | 3.0 | Myristic acid Butylstearate | 1.0 2.0 | |
| Example 62 | Black filler used in Example 16 | 14.0 | 0.5 | Myristic acid Butylstearate | 1.0 2.0 | |
| Example 63 | Black filler used in Example 17 | 14.0 | 0.0 | Myristic acid Butyl stearate | 1.0 2.0 | |
| Example 64 | Black filler used in Example 18 | 21.0 | 0.0 | Myristic acid Butyl stearate | 1.0 2.0 | |

| | Conditions for production of magnetic recording medium Binder resin | | | |
|---|---|---|---|---|
| Examples | Kind | Amount blended (wt part) | Kind | Amount blended (wt part) |
| Example 53 | Vinyl chloride-based resin MR-110 | 10.0 | Polyurethane resin TI-1075 | 10.0 |
| Example 54 | Vinyl chloride-based resin MR-110 | 10.0 | Polyurethane resin TI-1075 | 10.0 |
| Example 55 | Vinyl chidride-based resin MR-100 | 10.0 | Polyurethane resin TI-1075 | 10.0 |
| Example 56 | Vinyl chidride-based resin MR-110 | 10.0 | Polyurethane resin TI-1075 | 10.0 |
| Example 57 | Vinyl chidride-based resinMR-110 | 10.0 | Polyurethane resin TI-1075 | 10.0 |
| Example 58 | Vinyl chloride-based resin MR-110 | 10.0 | Polyurethane resin TI-1075 | 10.0 |
| Example 59 | Vinyl chloride-based resin Mr-110 | 10.0 | Polyurethane resin TI-1075 | 10.0 |
| Example 60 | Vinyl chloride-based resin MR-110 | 10.0 | Polyurethane resin TI-1075 | 10.0 |
| Example 61 | Vinyl chloride-based resin MR-110 | 10.0 | Polyurethane resin TI-1075 | 10.0 |
| Example 62 | Vinyl chidride-based resin MR-110 | 10.0 | Polyurethane resin TI-1075 | 10.0 |
| Example 63 | Vinyl chloride-based resin MR-110 | 10.0 | Polyurethane resin TI-1075 | 10.0 |
| Example 64 | Vinyl chloride-based resin MR-110 | 12.5 | Polyurethane resin TI-1075 | 7.5 |

| | Conditions for production of magnetic recording medium Binder resin | | Properties of magnetic coating material |
|---|---|---|---|
| Examples | Kind | Amount blended (part by weight) | Viscosity (cP) |
| Example 53 | Polyisocyanate E-31 | 5.0 | 2,765 |
| Example 54 | Polyisocyanate E-31 | 5.0 | 2,252 |
| Example 55 | Polyisocyanate E-31 | 5.0 | 3,100 |
| Example 56 | Polyisocyanate E-31 | 5.0 | 2,560 |
| Example 57 | Polyisocyanate E-31 | 5.0 | 2,074 |
| Example 58 | Polyisocyanate E-31 | 5.0 | 2,380 |
| Example 59 | Polyisocyanate E-31 | 5.0 | 2,048 |

TABLE 17-continued

| Example 60 | Polyisocyanate E-31 | 5.0 | 1,792 |
| Example 61 | Polyisocyanate E-31 | 5.0 | 2,944 |
| Example 62 | Polyisocyanate E-31 | 5.0 | 1,920 |
| Example 63 | Polyisocyanate E-31 | 5.0 | 1,536 |
| Example 64 | Polyisocyanate E-31 | 5.0 | 6,880 |

TABLE 18

| | Conditions for production of magnetic recording medium Magnetic particles | | | | | |
|---|---|---|---|---|---|---|
| Comparative Examples | Kind | Average particle size (μm) | BET specific surface area (m²/g) | Coercive force Hc (Oe) | Saturation magnetization σs (emu/g) | Amount blended (part by weight) |
| Comparative Example 43 | Co-coated magnetite | 0.24 | 31.3 | 683 | 82.8 | 100.0 |
| Comparative Example 44 | Co-coated magnetite | 0.24 | 31.3 | 683 | 82.8 | 100.0 |
| Comparative Example 45 | Co-coated magnetite | 0.24 | 31.3 | 683 | 82.8 | 100.0 |
| Comparative Example 46 | Co-coated magnetite | 0.24 | 31.3 | 683 | 82.8 | 100.0 |
| Comparative Example 47 | Co-coated magnetite | 0.24 | 31.3 | 683 | 82.8 | 100.0 |
| Comparative Example 48 | Co-coated magnetite | 0.24 | 31.3 | 683 | 82.8 | 100.0 |

| | Conditions for production of magnetic recording medium | | | | |
|---|---|---|---|---|---|
| | Filler | | Carbon | Other Additives | |
| Comparative Examples | Kind | Amount blended (wt part) | black blended (wt part) | Kind | Amount blended (wt part) |
| Comparative Example 43 | Filler used in Comparative Example 1 | 7.0 | 1.0 | Myristic acid Butyl stearate | 1.0 2.0 |
| Comparative Example 44 | Filler used in Comparative Example 2 | 7.0 | 1.0 | Myristic acid Butyl stearate | 1.0 2.0 |
| Comparative Example 45 | Filler used in Comparative Example 3 | 7.0 | 1.0 | Myristic acid Butyl stearate | 1.0 2.0 |
| Comparative Example 46 | Filler used in Comparative Example 8 | 7.0 | 1.0 | Myristic acid Butyl stearate | 1.0 2.0 |
| Comparative Example 47 | Filler used in Comparative Example 9 | 7.0 | 1.0 | Myristic acid Butyl stearate | 1.0 2.0 |
| Comparative Example 48 | Filler used in Comparative Example 10 | 7.0 | 1.0 | Myristic acid Butyl stearate | 1.0 2.0 |

| | Conditions for production of magnetic recording medium Binder resin | | | |
|---|---|---|---|---|
| Comparative Examples | Kind | Amount blended (wt part) | Kind | Amount blended (wt part) |
| Comparative Example 43 | Vinyl chloride-based resin MR-110 | 10.0 | Polyurethane resin TI-1075 | 10.0 |
| Comparative Example 44 | Vinyl chloride-based resin MR-110 | 10.0 | Polyurethane resin TI-1075 | 10.0 |
| Comparative Example 45 | Vinyl chloride-based resin MR-110 | 10.0 | Polyurethane resin TI-1075 | 10.0 |
| Comparative Example 46 | Vinyl chloride-based resin MR-110 | 10.0 | Polyurethane resin TI-1075 | 10.0 |
| Comparative Example 47 | Vinyl chloride-based resin MR-110 | 10.0 | Polyurethane resin TI-1075 | 10.0 |
| Comparative Example 48 | Vinyl chloride-based resin MR-110 | 10.0 | Polyurethane resin TI-l075 | 10.0 |

TABLE 18-continued

| | Conditions for production of magnetic recording medium Binder resin | | Properties of magnetic coating |
|---|---|---|---|
| Examples | Kind | Amount blended (part by weight) | material Viscosity (cP) |
| Comparative Example 43 | Polyisocyanate E-31 | 5.0 | 2,681 |
| Comparative Example 44 | Polyisocyanate E-31 | 5.0 | 2,560 |
| Comparative Example 45 | Polyisocyanate E-31 | 5.0 | 2,368 |
| Comparative Example 46 | Polyisocyanate E-31 | 5.0 | 2,268 |
| Comparative Example 47 | Polyisocyanate E-31 | 5.0 | 2,413 |
| Comparative Example 48 | Polyisocyanate E-31 | 5.0 | 3,512 |

TABLE 19

| | Properties of magnetic recording medium | | | | | |
|---|---|---|---|---|---|---|
| Examples | Coercive force Hc (Oe) | Residual magnetic flux density Br (Gauss) | Squareness Br/Bm | Degree of orientation OR | Gloss (%) | Linear coefficient ($\mu m^{-1}$) |
| Example 53 | 748 | 1,563 | 0.86 | 2.71 | 189 | 1.24 |
| Example 54 | 738 | 1,571 | 0.85 | 2.61 | 178 | 1.24 |
| Example 55 | 766 | 1,483 | 0.85 | 2.58 | 189 | 1.21 |
| Example 56 | 749 | 1,490 | 0.84 | 2.68 | 182 | 1.41 |
| Example 57 | 744 | 1,582 | 0.84 | 2.65 | 174 | 1.38 |
| Example 58 | 748 | 1,538 | 0.86 | 2.70 | 186 | 1.39 |
| Example 59 | 756 | 1,568 | 0.86 | 2.76 | 191 | 1.31 |
| Example 60 | 733 | 1,590 | 0.86 | 2.58 | 186 | 1.28 |
| Example 61 | 771 | 1,497 | 0.85 | 2.57 | 183 | 1.46 |
| Example 62 | 751 | 1,565 | 0.87 | 2.75 | 188 | 1.38 |
| Example 63 | 736 | 1,583 | 0.85 | 2.61 | 183 | 1.33 |
| Example 64 | 1,751 | 2,883 | 0.83 | 2.49 | 225 | 1.33 |

| | Properties of magnetic recording medium | | | | |
|---|---|---|---|---|---|
| | Signal recording property | | Durability | Electrical resistance | Surface roughness |
| Examples | 1 MHz (dB) | 4 MHz (dB) | (min) | ($\Omega/cm^2$) | Ra (nm) |
| Example 53 | +2.0 | +3.1 | 26.8 | 8.2E + 08 | 6.0 |
| Example 54 | +2.2 | +2.2 | ≧30 | 3.0E + 09 | 6.8 |
| Example 55 | +1.7 | +2.5 | 29.5 | 9.1E + 09 | 6.8 |
| Example 56 | +1.7 | +2.6 | ≧30 | 5.3E + 08 | 6.1 |
| Example 57 | +1.8 | +2.3 | ≧30 | 6.4E + 08 | 7.0 |
| Example 58 | +1.9 | +2.9 | ≧30 | 7.6E + 08 | 6.8 |
| Example 59 | +2.3 | +3.4 | 29.8 | 9.6E + 08 | 5.4 |
| Example 60 | +2.1 | +2.6 | ≧30 | 7.2E + 08 | 6.0 |
| Example 61 | +1.6 | +2.5 | ≧30 | 1.0E + 09 | 5.8 |
| Example 62 | +2.2 | +3.4 | ≧30 | 3.1E + 08 | 5.9 |
| Example 63 | +2.0 | +2.5 | ≧30 | 2.6E + 09 | 6.0 |
| Example 64 | +2.5 | +7.0 | ≧30 | 1.8E + 09 | 5.8 |

TABLE 20

| Comparative Examples | Properties of magnetic recording medium | | | | | |
|---|---|---|---|---|---|---|
| | Coercive force Hc (Oe) | Residual magnetic flux density Br (Gauss) | Squareness Br/Bm | Degree of orientation OR | Gloss (%) | Linear coefficient ($\mu m^{-1}$) |
| Comparative Example 43 | 729 | 1,480 | 0.82 | 2.47 | 171 | 1.20 |
| Comparative Example 44 | 728 | 1,462 | 0.80 | 2.28 | 160 | 1.13 |
| Comparative Example 45 | 731 | 1,508 | 0.81 | 2.31 | 166 | 1.15 |
| Comparative Example 46 | 728 | 1,526 | 0.84 | 2.38 | 172 | 1.21 |
| Comparative Example 47 | 735 | 1,516 | 0.84 | 2.41 | 174 | 1.23 |
| Comparative Example 48 | 726 | 1,500 | 0.83 | 2.46 | 169 | 1.21 |

| Examples | Properties of magnetic recording medium | | | | |
|---|---|---|---|---|---|
| | Signal recording property | | Durability (min) | Electrical resistance ($\Omega/cm^2$) | Surface roughness Ra (nm) |
| | 1 MHz (dB) | 4 NHz (dB) | | | |
| Comparative Example 43 | +1.3 | +1.8 | 22.8 | 2.6E + 09 | 7.6 |
| Comparative Example 44 | +0.7 | +0.7 | 16.8 | 8.9E + 08 | 10.1 |
| Comparative Example 45 | +1.3 | +1.5 | 21.6 | 1.0E + 09 | 8.0 |
| Comparative Example 46 | +1.8 | +2.0 | 18.8 | 4.6E + 09 | 9.3 |
| Comparative Example 47 | +1.5 | +2.0 | 19.8 | 1.6E + 09 | 8.6 |
| Comparative Example 48 | +0.9 | +1.4 | 17.8 | 3.8E + 10 | 10.6 |

What is claimed is:

1. Non-magnetic black particles containing Fe as a main component and having a hematite structure, which particles contain manganese in an amount of 5 to 40% by weight based on the weight of said non-magnetic black particles, a soluble sodium salt in an amount of not more than 500 ppm, calculated as Na, and a soluble sulfate in an amount of not more than 200 ppm, calculated as $SO_4$, and have an average particle size of 0.1 to 10.0 $\mu$m, a geometrical standard deviation of particle diameters of not more than 2 and a pH of not less than 5.5.

2. Non-magnetic black particles according to claim 1, which further have a coating layer formed on surfaces of said non-magnetic black particles and comprising at least one selected from the group consisting of hydroxides of aluminum, oxides of aluminum, hydroxides of silicon and oxides of silicon.

3. Non-magnetic black particles according to claim 1, wherein the manganese content is 10 to 30% by weight based on the weight of said non-magnetic black particles, and the average particle size is 0.1 to 0.5 $\mu$m.

4. Non-magnetic black particles according to claim 3, which further have a BET specific surface area of 1 to 50 $m^2/g$.

5. Non-magnetic black particles according to claim 3, which further have a coating layer formed on surfaces of said non-magnetic black particles and comprising at least one selected from the group consisting of hydroxides of aluminum, oxides of aluminum, hydroxides of silicon and oxides of silicon.

6. Non-magnetic black particles according to claim 3, wherein the silicon content is 0.01 to 50% by sea weight, calculated as $SiO_2$, based on the weight of said non-magnetic black particles and the aluminum content is 0.01 to 50% by weight, calculated as Al, based on the weight of said non-magnetic black particles.

7. A non-magnetic black pigment comprising said non-magnetic black particles as claimed in claim 1.

8. A non-magnetic black filler comprising said non-magnetic black particles as claimed in claim 3.

9. A non-magnetic black paint comprising 100 parts by weight of a paint base material and 0.1 to 200 parts by weight of said non-magnetic black pigment as claimed in claim 7.

10. A non-magnetic black rubber or resin composition comprising 100 parts by weight of a constituent base material for the rubber or resin composition and 0.01 to 200 parts by weight of said non-magnetic black pigment as claimed in claim 7.

11. A process for producing non-magnetic black particles having a hematite structure and containing Fe as a main element, which contain manganese in an amount of 5 to 40% by weight based on the weight of the non-magnetic black particles, a soluble sodium salt in an amount of not more than 500 ppm (calculated as Na), and a soluble sulfate in an amount of not more than 200 ppm (calculated as $SO_4$), and have an average particle size of 0.1 to 10.0 $\mu$m and a pH of not less than 5.5, which process comprises:

wet-pulverizing a slurry containing Mn-containing >octahedral or spherical particles composed primarily of Fe and having a hematite structure which have an average particle size of 0.1 to 10.0 $\mu$m, adjusting the pH of the suspension to not less than 13, and then heat-treating the resultant suspension at a temperature of not less than 80° C.

* * * * *